(12) United States Patent
Furuta

(10) Patent No.: US 12,049,115 B2
(45) Date of Patent: Jul. 30, 2024

(54) VIBRATION DAMPING CONTROL APPARATUS FOR VEHICLE, AND VIBRATION DAMPING CONTROL METHOD

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 718 days.

(21) Appl. No.: 17/168,591

(22) Filed: Feb. 5, 2021

(65) Prior Publication Data

US 2021/0331549 A1 Oct. 28, 2021

(30) Foreign Application Priority Data

Apr. 28, 2020 (JP) ................................. 2020-079737

(51) Int. Cl.
  *B60G 17/0165* (2006.01)
(52) U.S. Cl.
  CPC .... *B60G 17/0165* (2013.01); *B60G 2400/204* (2013.01); *B60G 2400/252* (2013.01); *B60G 2400/91* (2013.01); *B60G 2500/10* (2013.01)
(58) Field of Classification Search
  CPC .......... B60G 17/0165; B60G 2400/204; B60G 2400/252; B60G 2400/91; B60G 2500/10;
  (Continued)

(56) References Cited

U.S. PATENT DOCUMENTS

| 11,602,970 B2 * | 3/2023 | Goto ................... B60G 17/0157 |
| 2010/0204885 A1 * | 8/2010 | Kajino ............... B60G 21/0555 |
| | | 701/37 |

(Continued)

FOREIGN PATENT DOCUMENTS

| JP | H07315028 A | 12/1995 |
| JP | 2009-096366 A | 5/2009 |

(Continued)

OTHER PUBLICATIONS

Machine Translation: JP-2020026187-A (Year: 2020).*

*Primary Examiner* — Anne Marie Antonucci
*Assistant Examiner* — Connor L Knight
(74) *Attorney, Agent, or Firm* — Dinsmore & Shohl LLP

(57) ABSTRACT

An apparatus includes a generator and a control unit. The generator generates a vertical controlling force between a vehicle body and one wheel for damping a vehicle sprung mass vibration. The control unit changes the controlling force by controlling the generator based on an unsprung mass state quantity at an estimated passage position of the wheel at time after a predetermined time from current time; when a condition that a sprung mass of a sampling vehicle is highly likely to be resonating when the sampling vehicle passes through the estimated passage position is satisfied, compute a target controlling force based on a value less than the unsprung mass state quantity acquired by the sampling vehicle at the estimated passage position; and, at the time at which the wheel passes through the estimated passage position, control the generator such that a controlling force is equal to the target controlling force.

5 Claims, 12 Drawing Sheets

(58) Field of Classification Search
CPC .......... B60G 2400/102; B60G 2400/82; B60G 17/06; B60G 17/0157
See application file for complete search history.

(56) References Cited

U.S. PATENT DOCUMENTS

| | | |
|---|---|---|
| 2010/0324780 A1 | 12/2010 | Koumura et al. |
| 2014/0005888 A1* | 1/2014 | Bose .................. B60G 17/0165 701/37 |
| 2018/0154723 A1 | 6/2018 | Anderson et al. |
| 2019/0344634 A1* | 11/2019 | Kim ..................... B60G 17/019 |
| 2020/0331317 A1* | 10/2020 | Nasu .................... B60W 10/20 |
| 2021/0055740 A1* | 2/2021 | Sridhar ................ G05D 1/0278 |
| 2021/0283972 A1* | 9/2021 | Coerman ........... B60G 17/0165 |
| 2022/0097473 A1* | 3/2022 | Kasuya ............. B60G 17/0182 |

FOREIGN PATENT DOCUMENTS

| | | | | |
|---|---|---|---|---|
| JP | 2016-107778 A | | 6/2016 | |
| JP | 2020026187 A | * | 2/2020 | ............ H01J 27/022 |

\* cited by examiner

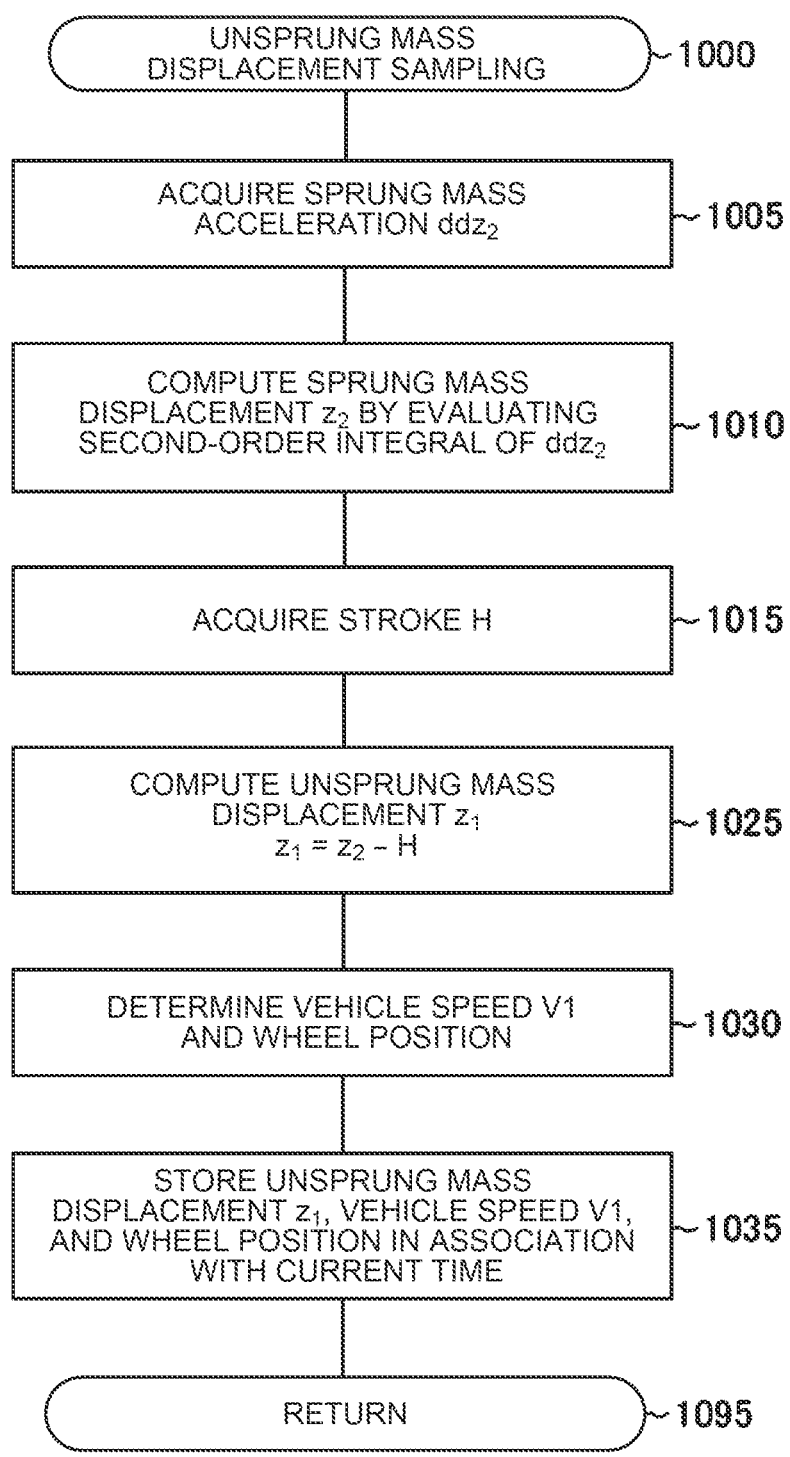

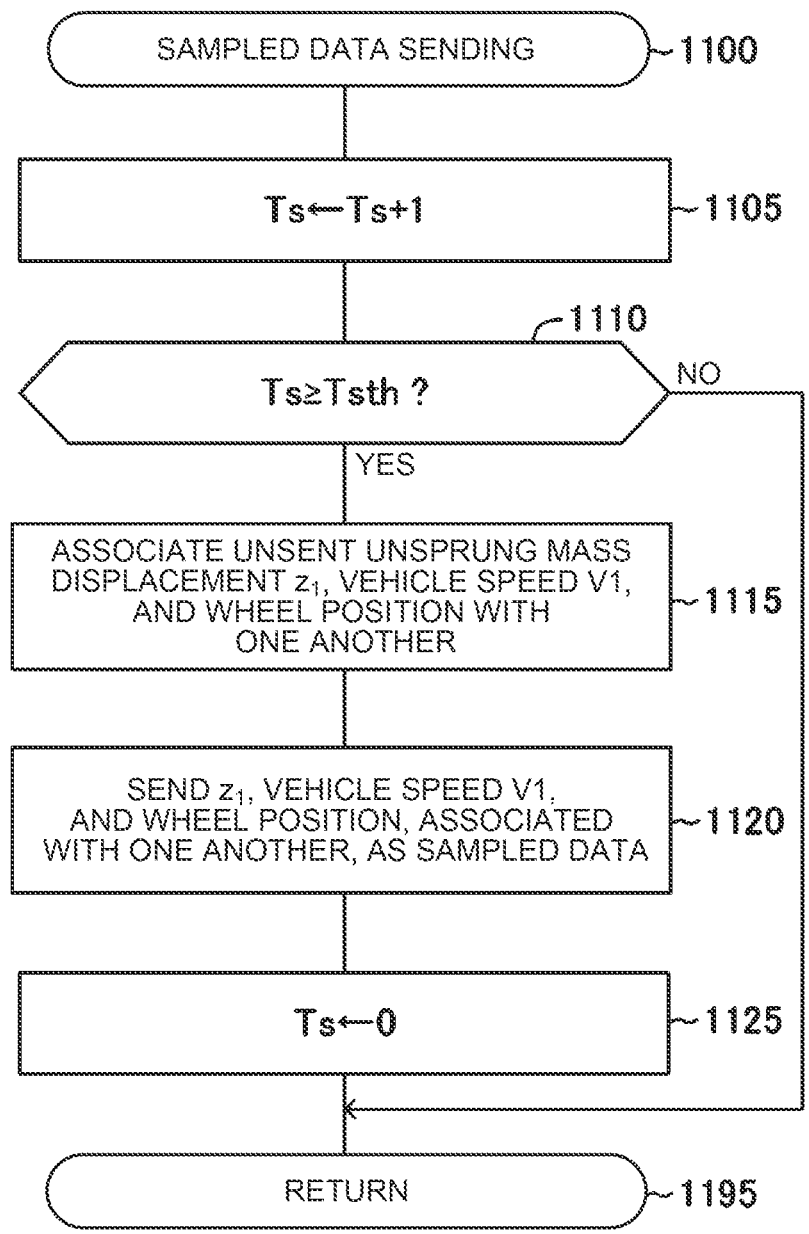

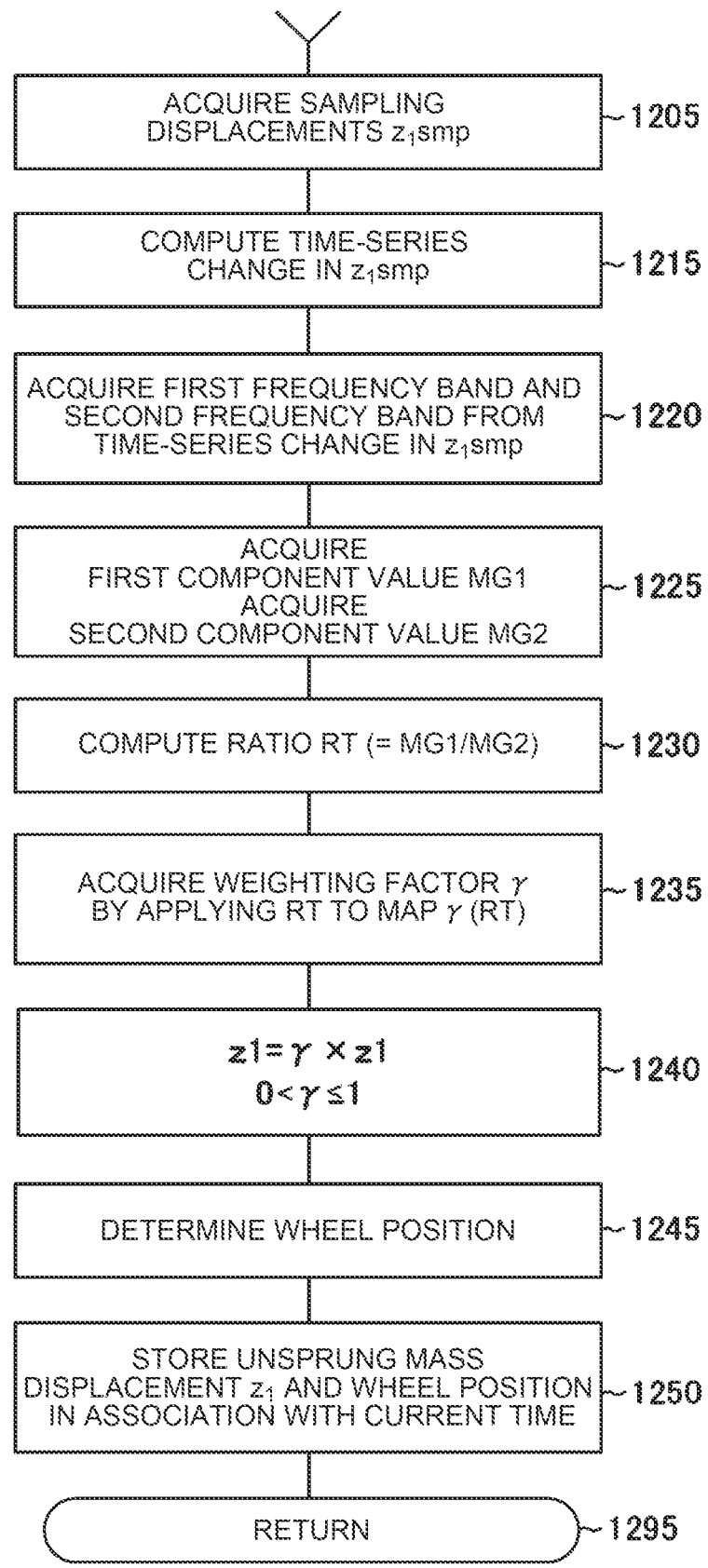

VIBRATION DAMPING CONTROL APPARATUS FOR VEHICLE, AND VIBRATION DAMPING CONTROL METHOD

CROSS-REFERENCE TO RELATED APPLICATION

This application claims priority to Japanese Patent Application No. 2020-079737 filed on Apr. 28, 2020, incorporated herein by reference in its entirety.

BACKGROUND

1. Technical Field

The present disclosure relates to a vibration damping control apparatus for a vehicle, which is configured to generate a controlling force for damping the vibration of a sprung mass based on an unsprung mass state quantity at an estimated passage position through which a wheel is estimated to pass at a point in time after a lapse of a predetermined period of time from a current point in time.

2. Description of Related Art

Hitherto, a vibration damping control apparatus for a vehicle, which generates a controlling force for damping the vibration of a sprung mass based on a displacement of a road surface ahead of a current ground contact position of a wheel, is known. Such vibration damping control is also referred to as preview vibration damping control. An existing apparatus described in, for example, US 2018/154723 A executes preview vibration damping control based on preview reference data including position information of a vehicle and road surface information. The preview reference data is stored in a server that is able to communicate with the existing apparatus. The existing apparatus uses the preview reference data by downloading the preview reference data from the server. The road surface information included in the preview reference data used by the existing apparatus is a value indicating a displacement of a road surface in a vertical direction (road surface displacement) and is generated based on sensing data acquired by a preview sensor, such as a camera sensor, LIDAR, radar, and a plane or three-dimensional scanning sensor.

SUMMARY

As described above, a road surface displacement included in preview reference data is acquired based on sensing data (for example, image data) acquired by the preview sensor. Such a road surface displacement acquired based on sensing data is highly likely to have a significant error relative to an actual road surface displacement (that is, the accuracy of a road surface displacement acquired based on sensing data with respect to an actual road surface displacement is highly likely to be low).

For this reason, the inventors have examined a vibration damping control apparatus (hereinafter, referred to as examination apparatus) that executes preview vibration damping control by using preview reference data in which an unsprung mass displacement that is a value indicating a displacement of unsprung mass in a vertical direction, instead of a road surface displacement, is associated with position information. In such preview reference data, an unsprung mass displacement acquired at the time when at least one of a vehicle and a different vehicle (hereinafter, referred to as sampling vehicle) has actually traveled on a road surface and the position information of a wheel of which the unsprung mass displacement has been acquired are presumably associated with each other.

In general, each wheel of the sampling vehicle undergoes displacement in the vertical direction according to a road surface displacement, so an unsprung mass displacement of each wheel has a correlation with a road surface displacement. However, when a sprung mass of the sampling vehicle is resonating, a deflection of tires is larger than usual due to the resonance of the sprung mass. For this reason, an unsprung mass displacement (actually measured unsprung mass displacement) acquired by the sampling vehicle during resonance of the sprung mass of the sampling vehicle is highly likely to be greater than an unsprung mass displacement having a correlation with an actual road surface displacement. Therefore, preview reference data may include such an unsprung mass displacement greater than an unsprung mass displacement having a correlation with an actual road surface displacement (hereinafter, referred to as excessive unsprung mass displacement).

When the examination apparatus acquires the excessive unsprung mass displacement as an unsprung mass displacement at an estimated passage position from preview reference data, a controlling force greater than a controlling force needed (hereinafter, referred to as necessary controlling force) for a road surface displacement at the estimated passage position is generated. If such a controlling force greater than a necessary controlling force is generated, the vibration of the sprung mass is highly likely to be not damped under preview vibration damping control (that is, the vibration damping performance of preview vibration damping control is highly likely to decrease).

The disclosure addresses the above-described inconvenience. In other words, the disclosure provides a vibration damping control apparatus for a vehicle, which is capable of reducing a possible decrease in the vibration damping performance of preview vibration damping control even when a sprung mass of a sampling vehicle has been resonating at the time when the sampling vehicle acquires an unsprung mass state quantity.

A vibration damping control apparatus of an aspect of the disclosure (hereinafter, also referred to as disclosed apparatus) includes a controlling force generator configured to generate a controlling force in a vertical direction between a vehicle body portion and at least one wheel for damping a vibration of a sprung mass of a vehicle, and a control unit configured to change the controlling force by controlling the controlling force generator based on an unsprung mass state quantity at an estimated passage position through which the at least one wheel is estimated to pass at a point in time after a lapse of a predetermined period of time from current time. The unsprung mass state quantity is a value acquired when a sampling vehicle that is at least one of the vehicle and a different vehicle travels on a road surface and is a value indicating a state of displacement of an unsprung mass of the sampling vehicle that is displaced in the up-down direction due to a displacement of the road surface in the vertical direction.

The control unit is configured to: when a sprung mass resonance condition that is satisfied in a case where the sprung mass of the sampling vehicle is highly likely to be resonating when the sampling vehicle passes through the estimated passage position is not satisfied, compute a target controlling force based on the unsprung mass state quantity acquired by the sampling vehicle at the estimated passage position, the target controlling force being a target value of the controlling force generated by the controlling force generator at a point in time at which the at least one wheel of the vehicle passes through the estimated passage position; when the sprung mass resonance condition is satisfied, compute the target controlling force based on a value less than the unsprung mass state quantity acquired by the sampling vehicle at the estimated passage position; and, at the point in time at which the at least one wheel of the vehicle passes through the estimated passage position, control the controlling force generator such that a controlling force generated by the controlling force generator is equal to the target controlling force.

The disclosed apparatus is configured to, when the sprung mass resonance condition is satisfied, compute the target controlling force based on a value less than the unsprung mass state quantity acquired by the sampling vehicle at the estimated passage position. With this configuration, even when an unsprung mass displacement is an excessive unsprung mass displacement due to a fact that the sprung mass has been resonating at the time when the sampling vehicle samples (acquires) an unsprung mass displacement, it is possible to reduce the possibility of an excessive target controlling force. Therefore, it is possible to reduce a possible decrease in the vibration damping performance of preview vibration damping control.

In one embodiment of the aspect of the disclosed apparatus, the control unit may be configured to: acquire a plurality of unsprung mass state quantities in a predetermined sampling section including the estimated passage position as sampled state quantities from preview reference data including a set of data in which an unsprung mass state quantity acquired when the sampling vehicle travels on the road surface and position information indicating a position of the at least one wheel at which the unsprung mass state quantity is acquired are associated with each other; when a relation between an evaluation value, which is calculated based on the sampled state quantities and used to determine whether the sprung mass resonance condition is satisfied, and a preset threshold does not satisfy a predetermined condition, determine that the sprung mass resonance condition is not satisfied, and compute the target controlling force based on the sprung mass state quantity at the estimated passage position, acquired from the preview reference data; and when the relation between the evaluation value and the threshold satisfies the predetermined condition, determine that the sprung mass resonance condition is satisfied, and compute the target controlling force based on a value less than the unsprung mass state quantity at the estimated passage position, acquired from the preview reference data.

According to the above embodiment, whether the sprung mass resonance condition is satisfied is determined based on sampled state quantities actually acquired by the sampling vehicle in a sampling section. Therefore, the disclosed apparatus is capable of further accurately determining whether the sprung mass of the sampling vehicle has been resonating at an estimated passage position, that is, whether an unsprung mass state quantity at an estimated passage position is an excessive unsprung mass state quantity. Therefore, it is possible to reduce a possible decrease in the vibration damping performance of preview vibration damping control.

In the above embodiment, the control unit may be configured to: compute a time-series change in the sampled state quantity based on a vehicle speed when the sampling vehicle travels in the sampling section; based on the time-series change, compute a first component value indicating a magnitude of the sampled state quantities in a first frequency band including a preset sprung resonant frequency, and a second component value indicating a magnitude of the sampled state quantities in a second frequency band including a minimum frequency higher than a maximum frequency of the first frequency band; compute a ratio of the first component value to the second component value as the evaluation value; and when the ratio is higher than or equal to a preset threshold ratio, determine that the sprung mass resonance condition is satisfied.

When the ratio of a first component value indicating a magnitude of the sampled state quantities in a first frequency band including the sprung mass resonant frequency to a second component value indicating a magnitude of the sampled state quantities in a second frequency band including a minimum frequency higher than or equal to a maximum frequency of the first frequency band is higher than or equal to the threshold ratio, the sprung mass of the sampling vehicle having traveled in the sampling section is highly likely to have been resonating. According to the above embodiment, when the ratio is higher than or equal to the threshold ratio, it is determined that the sprung mass resonance condition is satisfied, so the disclosed apparatus is capable of further accurately determining whether the sprung mass of the sampling vehicle has been resonating at an estimated passage position, that is, whether an unsprung mass state quantity at an estimated passage position is an excessive unsprung mass state quantity. Therefore, it is possible to reduce a possible decrease in the vibration damping performance of preview vibration damping control.

In one embodiment of the aspect of the disclosure, the control unit may be configured to: acquire the unsprung mass state quantity at the estimated passage position from preview reference data, the preview reference data including a set of data in which an unsprung mass state quantity acquired when the sampling vehicle actually travels on the road surface and position information indicating a position of the at least one wheel when the unsprung mass state quantity is acquired are associated with each other; and compute a target controlling force based on the unsprung mass state quantity at the estimated passage position, the unsprung mass state quantity acquired by the sampling vehicle may be directly stored in the preview reference data in a case where the sprung mass resonance condition is not satisfied at a point in time at which the sampling vehicle acquires the unsprung mass state quantity, and a value less than the unsprung mass state quantity acquired by the sampling vehicle may be stored in the preview reference data in a case where the sprung mass resonance condition is satisfied at the point in time at which the sampling vehicle acquires the unsprung mass state quantity.

According to the above embodiment, a value less than the unsprung mass state quantity is stored in the preview reference data when the sprung mass resonance condition is satisfied at a point in time at which the sampling vehicle acquires the unsprung mass state quantity. Therefore, the control unit does not need to execute a process of determining whether the sprung mass resonance condition is satisfied, so it is possible to reduce processing load on the control unit.

In the above embodiment, a relation between an evaluation value, which is calculated based on sampled state quantities that are a plurality of unsprung mass state quantities acquired by the sampling vehicle in a predetermined sampling section including a position at which the sampling vehicle acquires the unsprung mass state quantities and used to determine whether the sprung mass resonance condition is satisfied, and a preset threshold satisfies a predetermined condition, it may be determined that the sprung mass resonance condition is satisfied, and values respectively less than the unsprung mass state quantities acquired by the sampling vehicle may be stored in the preview reference data.

According to the above embodiment, whether the sprung mass resonance condition is satisfied is determined based on sampled state quantities actually acquired by the sampling vehicle in a sampling section. With this configuration, it is possible to further accurately determine whether the sprung mass of the sampling vehicle has been resonating at an estimated passage position, that is, whether an unsprung mass displacement at an estimated passage position is an excessive unsprung mass displacement. Therefore, it is possible to reduce a possible decrease in the vibration damping performance of preview vibration damping control.

In the above embodiment, based on a time-series change in the sampled state quantity when the sampling vehicle travels in the sampling section, a first component value indicating a magnitude of the sampled state quantities in a first frequency band including a sprung resonant frequency of the sampling vehicle and a second component value indicating a magnitude of the sampled state quantities in a second frequency band including a minimum frequency higher than a maximum frequency of the first frequency band may be computed, and, when a ratio of the first component value to the second component value, computed as the evaluation value, is higher than or equal to a preset threshold ratio, it may be determined that the sprung mass resonance condition is satisfied, and a value less than the unsprung mass state quantity acquired by the sampling vehicle may be stored in the preview reference data.

When the ratio is higher than or equal to the threshold ratio, the sprung mass of the sampling vehicle is highly likely to have been resonating. According to the above embodiment, when the ratio is higher than or equal to the threshold ratio, it is determined that the sprung mass resonance condition is satisfied, so it is possible to further accurately determine whether the sprung mass of the sampling vehicle has been resonating at an estimated passage position, that is, whether an unsprung mass displacement at an estimated passage position is an excessive unsprung mass displacement. Therefore, it is possible to reduce a possible decrease in the vibration damping performance of preview vibration damping control.

A vibration damping control method of another aspect of the disclosure is a method that changes a controlling force in a vertical direction for damping a vibration of a sprung mass of a vehicle by controlling a controlling force generator, which is configured to generate the controlling force between a vehicle body portion and at least one wheel, based on an unsprung mass state quantity at an estimated passage position through which the at least one wheel is estimated to pass at a point in time after a lapse of a predetermined period of time from current time. The unsprung mass state quantity is a value acquired when a sampling vehicle that is at least one of the vehicle and a different vehicle travels on a road surface and is a value indicating a state of displacement of an unsprung mass of the sampling vehicle that is displaced in the up-down direction due to a displacement of the road surface in the vertical direction. The vibration damping control method includes: when a sprung mass resonance condition that is satisfied in a case where the sprung mass of the sampling vehicle is highly likely to be resonating when the sampling vehicle passes through the estimated passage position is not satisfied, computing a target controlling force based on the unsprung mass state quantity acquired by the sampling vehicle at the estimated passage position, the target controlling force being a target value of the controlling force generated by the controlling force generator at a point in time at which the at least one wheel of the vehicle passes through the estimated passage position; when the sprung mass resonance condition is satisfied, computing the target controlling force based on a value less than the unsprung mass state quantity acquired by the sampling vehicle at the estimated passage position; and, at the point in time at which the at least one wheel of the vehicle passes through the estimated passage position, controlling the controlling force generator such that a controlling force generated by the controlling force generator is equal to the target controlling force.

With the vibration damping control method, even when an unsprung mass displacement is an excessive unsprung mass displacement due to a fact that the sprung mass has been resonating at the time when the sampling vehicle samples (acquires) an unsprung mass displacement, it is possible to reduce the possibility of an excessive target controlling force. Therefore, it is possible to reduce a possible decrease in the vibration damping performance of preview vibration damping control.

Other objects, other features, and associated advantages of the disclosure are easily understood from the description of embodiments of the disclosure, which will be described with reference to the accompanying drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart showing a routine to be executed by the CPU of the electronic control unit;

FIG. 11 is a flowchart showing a routine to be executed by the CPU of the electronic control unit; and FIG. 12 is a flowchart showing a routine to be executed by the CPU of the electronic control unit according to a modification of the embodiment of the disclosure.

DETAILED DESCRIPTION OF EMBODIMENTS

Configuration

Figure 1:
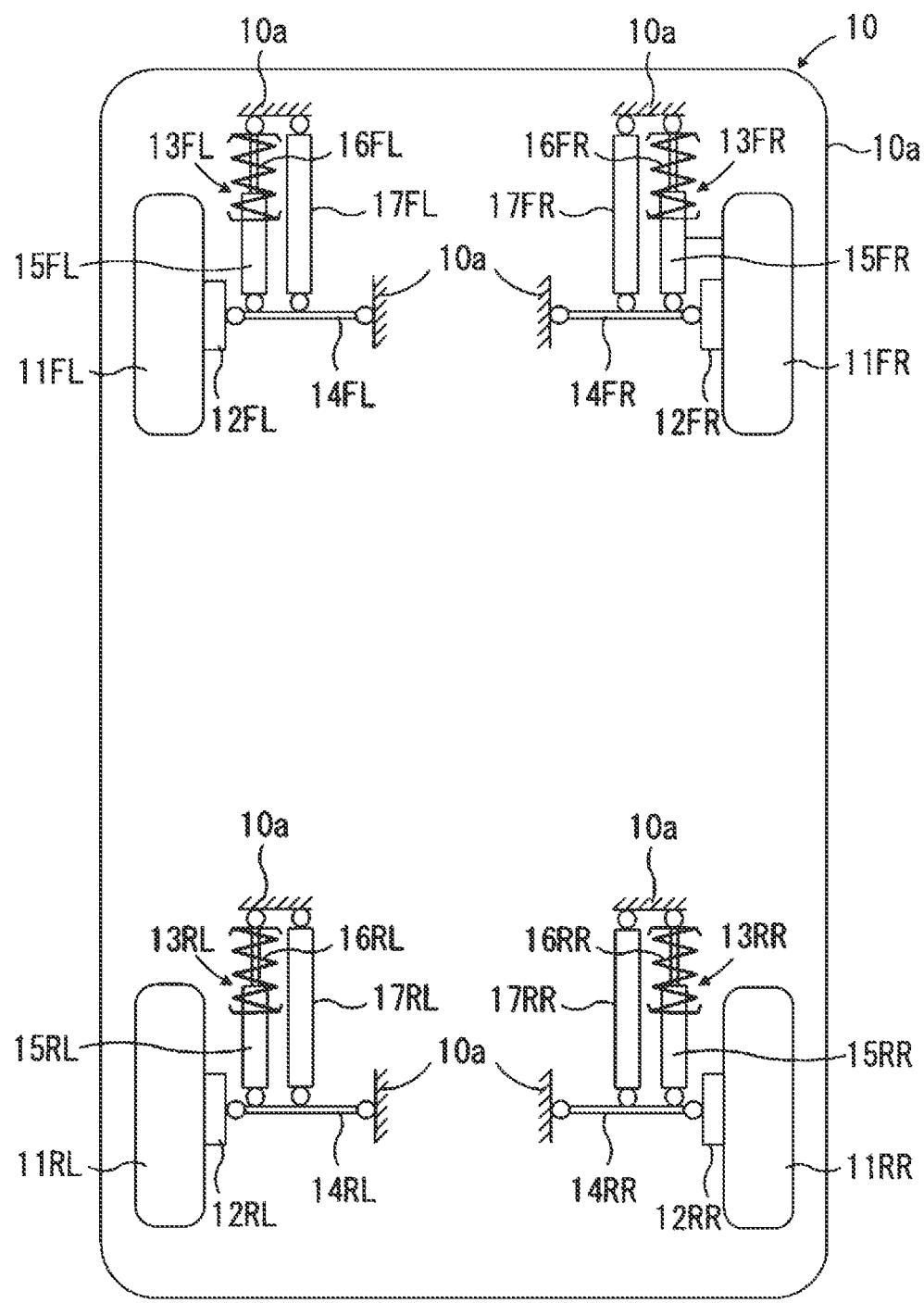
FIG. 1 is a schematic configuration diagram of a vehicle to which a preview vibration damping control apparatus according to an embodiment of the disclosure is applied.
Figure 2:
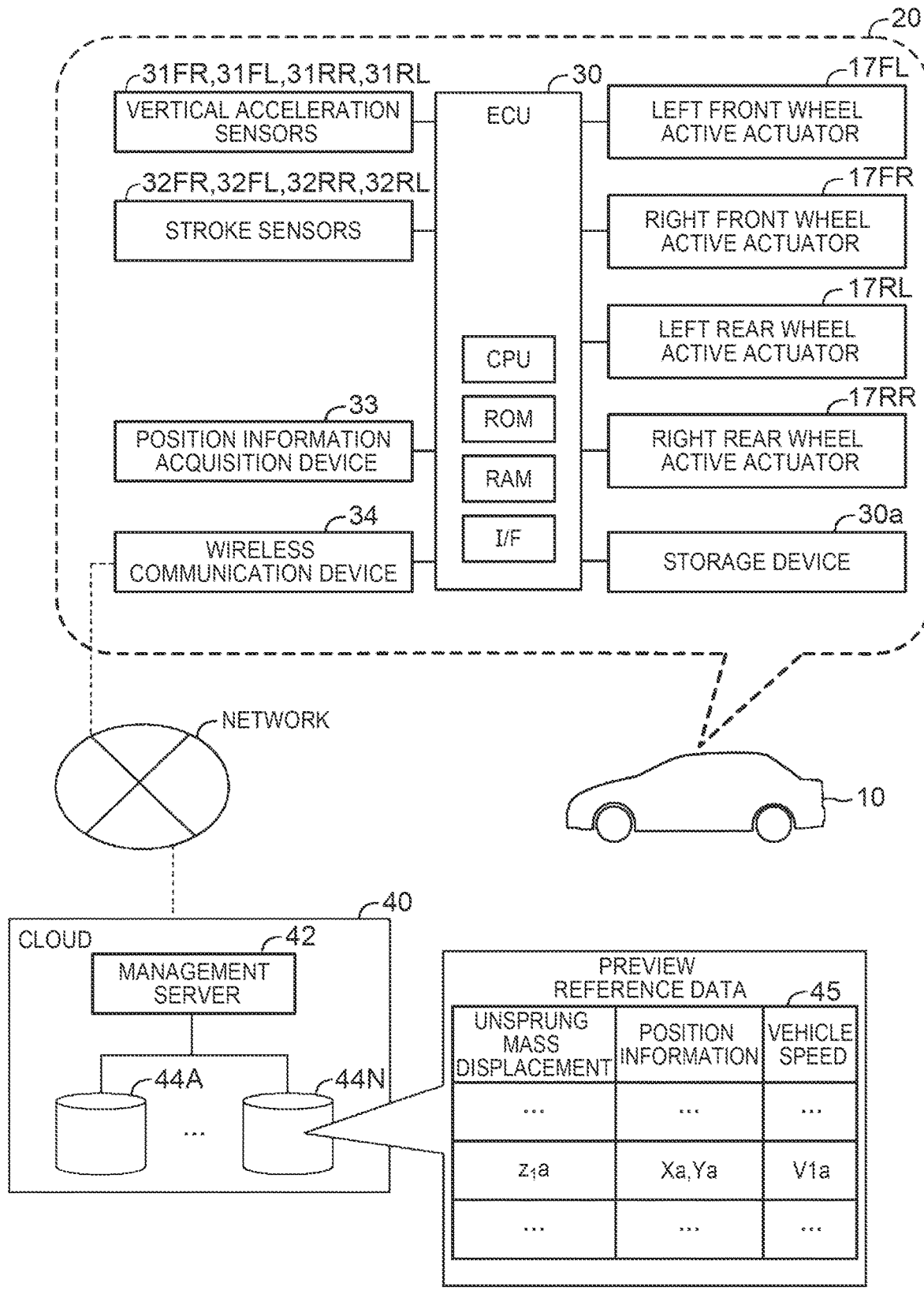
FIG. 2 is a schematic configuration diagram of the preview vibration damping control apparatus according to the embodiment of the disclosure.

A vibration damping control apparatus for a vehicle according to an embodiment of the disclosure is applied to a vehicle 10 shown in FIG. 1. As shown in FIG. 2, the vibration damping control apparatus is also referred to as vibration damping control apparatus 20, hereinafter.

As shown in FIG. 1, the vehicle 10 includes a right front wheel 11FR, a left front wheel 11FL, a right rear wheel 11RR, and a left rear wheel 11RL. The left front wheel 11FL is rotatably supported by a wheel support member 12FL on a vehicle body 10a. The right front wheel 11FR is rotatably supported by a wheel support member 12FR on the vehicle body 10a. The left rear wheel 11RL is rotatably supported by a wheel support member 12RL on the vehicle body 10a. The right rear wheel 11RR is rotatably supported by a wheel support member 12RR on the vehicle body 10a.

The right front wheel 11FR, the left front wheel 11FL, the right rear wheel 11RR, and the left rear wheel 11RL are referred to as wheels 11 when not distinguished from one another. Similarly, the right front wheel 11FR and the left front wheel 11FL are referred to as front wheels 11F. Similarly, the right rear wheel 11RR and the left rear wheel 11RL are referred to as rear wheels 11R. The wheel support members 12FR, 12FL, 12RR, 12RL are referred to as wheel support members 12.

The vehicle 10 further includes a right front wheel suspension 13FR, a left front wheel suspension 13FL, a right rear wheel suspension 13RR, and a left rear wheel suspension 13RL. The suspensions 13FR, 13FL, 13RR, 13RL are independent suspensions. Alternatively, the suspensions 13FR, 13FL, 13RR, 13RL may be of another type. The details of the suspensions 13FR, 13FL, 13RR, 13RL will be described in detail below.

The left front wheel suspension 13FL suspends the left front wheel 11FL from the vehicle body 10a. The left front wheel suspension 13FL includes a suspension arm 14FL, a shock absorber 15FL, and a suspension spring 16FL. The right front wheel suspension 13FR suspends the right front wheel 11FR from the vehicle body 10a. The right front wheel suspension 13FR includes a suspension arm 14FR, a shock absorber 15FR, and a suspension spring 16FR.

The left rear wheel suspension 13RL suspends the left rear wheel 11RL from the vehicle body 10a. The left rear wheel suspension 13RL includes a suspension arm 14RL, a shock absorber 15RL, and a suspension spring 16RL. The right rear wheel suspension 13RR suspends the right rear wheel 11RR from the vehicle body 10a. The right rear wheel suspension 13RR includes a suspension arm 14RR, a shock absorber 15RR, and a suspension spring 16RR.

The right front wheel suspension 13FR, the left front wheel suspension 13FL, the right rear wheel suspension 13RR, and the left rear wheel suspension 13RL are referred to as suspensions 13 when not distinguished from one another. Similarly, the suspension arms 14FR, 14FL, 14RR, 14RL are referred to as suspension arms 14. Similarly, the shock absorbers 15FR, 15FL, 15RR, 15RL are referred to as shock absorbers 15. Similarly, the suspension springs 16FR, 16FL, 16RR, 16RL are referred to as suspension springs 16.

Each of the suspension arms 14 couples the wheel support member 12 to the vehicle body 10a. In FIG. 1, one suspension arm 14 is shown in association with one suspension 13. Alternatively, a plurality of the suspension arms 14 may be provided in association with one suspension 13.

Each of the shock absorbers 15 is disposed between the vehicle body 10a and the suspension arm 14. The shock absorber 15 is coupled to the vehicle body 10a at its top end and is coupled to the suspension arm 14 at its bottom end. Each of the suspension springs 16 is elastically installed between the vehicle body 10a and the suspension arm 14 via the shock absorber 15. In other words, the top end of the suspension spring 16 is coupled to the vehicle body 10a, and the bottom end of the suspension spring 16 is coupled to the cylinder of the shock absorber 15. In such an elastic installation of the suspension spring 16, the shock absorber 15 may be disposed between the vehicle body 10a and the wheel support member 12.

In the present embodiment, the shock absorber 15 is a fixed damping force shock absorber. Alternatively, the shock absorber 15 may be a variable damping force shock absorber. In addition, the suspension spring 16 may be elastically installed between the vehicle body 10a and the suspension arm 14 without intervening the shock absorber 15. In other words, the top end of the suspension spring 16 may be coupled to the vehicle body 10a, and the bottom end of the suspension spring 16 may be coupled to the suspension arm 14. In such an elastic installation of the suspension spring 16, the shock absorber 15 and the suspension spring 16 may be disposed between the vehicle body 10a and the wheel support member 12.

Figure 3:
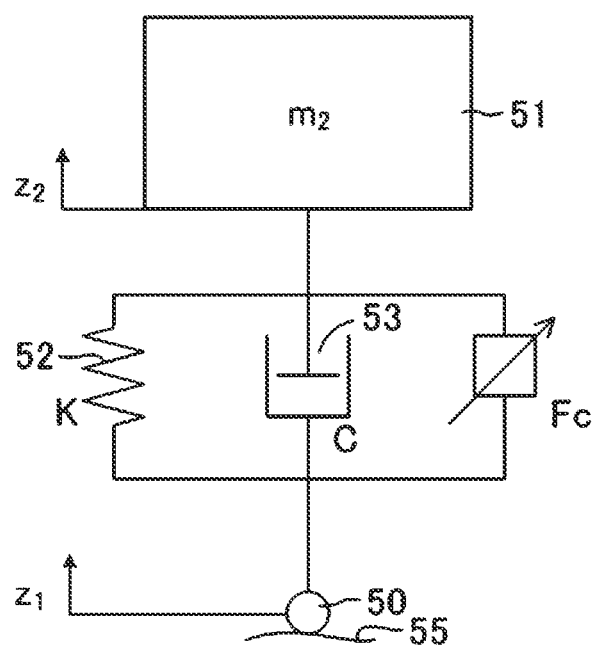
FIG. 3 is a diagram showing a single-wheel model of the vehicle.

Of members such as the wheel 11 and shock absorber 15 of the vehicle 10, a wheel 11-side portion with respect to the suspension spring 16 is referred to unsprung mass 50 or unsprung member 50 (see FIG. 3). In contrast, of members such as the vehicle body 10a and shock absorber 15 of the vehicle 10, a vehicle body 10a-side portion relative to the suspension spring 16 is referred to as sprung mass 51 or sprung member 51 (see FIG. 3).

A right front wheel active actuator 17FR is provided between the vehicle body 10a and the suspension arm 14FR. A left front wheel active actuator 17FL is provided between the vehicle body 10a and the suspension arm 14FL. A right rear wheel active actuator 17RR is provided between the vehicle body 10a and the suspension arm 14RR. A left rear wheel active actuator 17RL is provided between the vehicle body 10a and the suspension arm 14RL. The active actuators 17FR, 17FL, 17RR, 17RL are respectively provided in parallel with the shock absorbers 15FR, 15FL, 15RR, 15RL and the suspension springs 16FR, 16FL, 16RR, 16RL.

The right front wheel active actuator 17FR, the left front wheel active actuator 17FL, the right rear wheel active actuator 17RR, and the left rear wheel active actuator 17RL are referred to as active actuators 17 when not distinguished from one another. Similarly, the right front wheel active actuator 17FR and the left front wheel active actuator 17FL are referred to as front wheel active actuators 17F. Similarly, the right rear wheel active actuator 17RR and the left rear wheel active actuator 17RL are referred to as rear wheel active actuators 17R.

Each of the active actuators 17 generates a controlling force Fc based on a control command from an electronic control unit 30 shown in FIG. 2. The controlling force Fc is a force in a vertical direction, which acts between the vehicle body 10a and the wheel 11 (that is, between the sprung mass 51 and the unsprung mass 50) to damp the vibration of the sprung mass 51. The electronic control unit 30 is referred to as ECU 30 and may also be referred to as control unit 30 or controller 30. The active actuator 17 may be referred to as controlling force generator 17. The active actuator 17 is an electromagnetic active suspension device. The active actuator 17 constitutes an active suspension in cooperation with the shock absorber 15, the suspension spring 16, and the like.

As shown in FIG. 2, the vibration damping control apparatus 20 includes a storage device 30a, vertical acceleration sensors 31FR, 31FL, 31RR, 31RL, stroke sensors 32FR, 32FL, 32RR, 32RL, a position information acquisition device 33, and a wireless communication device 34 in addition to the ECU 30. The vibration damping control apparatus 20 further includes the active actuators 17FR, 17FL, 17RR, 17RL.

The ECU 30 includes a microcomputer. The microcomputer includes a CPU, ROM, RAM, an interface (I/F), and the like. The CPU implements various functions by running instructions (programs and routines) stored in the ROM.

The ECU 30 is connected to the nonvolatile storage device 30a to or from which information can be written or read. In the present embodiment, the storage device 30a is a hard disk drive. The ECU 30 is capable of storing (saving) information in the storage device 30a and reading out information stored (saved) in the storage device 30a. The storage device 30a is not limited to the hard disk drive and may be a known storage device or storage medium to or from which information can be written or read.

The ECU 30 is connected to the vertical acceleration sensors 31FR, 31FL, 31RR, 31RL and the stroke sensors 32FR, 32FL, 32RR, 32RL and receives signals output from the sensors.

Each of the vertical acceleration sensors 31FR, 31FL, 31RR, 31RL detects a corresponding one of the vertical accelerations (sprung mass accelerations $ddz_2FR$, $ddz_2FL$, $ddz_2RR$, $ddz_2RL$) of the vehicle body 10a (sprung mass 51) at positions of the wheels 11FR, 11FL, 11RR, 11RL and outputs a signal indicating the corresponding vertical acceleration. The vertical acceleration sensors 31FR, 31FL, 31RR, 31RL are referred to as vertical acceleration sensors 31 when not distinguished from one another. Similarly, the sprung mass accelerations $ddz_2FR$, $ddz_2FL$, $ddz_2RR$, $ddz_2RL$ are referred to as sprung mass accelerations $ddz_2$.

The stroke sensors 32FR, 32FL, 32RR, 32RL are respectively provided for the right front wheel suspension 13FR, the left front wheel suspension 13FL, the right rear wheel suspension 13RR, and the left rear wheel suspension 13RL. Each of the stroke sensors 32FR, 32FL, 32RR, 32RL detects a corresponding one of strokes Hfr, Hfl, Hrr, Hrl, in the vertical direction, of the suspensions 13FR, 13FL, 13RR, 13RL and outputs a signal indicating the corresponding vertical stroke. Each of the strokes Hfr, Hfl, Hrr, Hrl is the vertical stroke between part of the vehicle body 10a (sprung mass 51), corresponding the position of a corresponding one of the wheels 11 shown in FIG. 1, and a corresponding one of the wheel support members 12FR, 12FL, 12RR, 12RL. The stroke sensors 32FR, 32FL, 32RR, 32RL are referred to as stroke sensors 32 when not distinguished from one another. Similarly, the strokes Hfr, Hfl, Hrr, Hrl are referred to as strokes H.

The ECU 30 is also connected to the position information acquisition device 33 and the wireless communication device 34.

The position information acquisition device 33 includes a global navigation satellite system (GNSS) receiver and a map database. The GNSS receiver receives signals from artificial satellites (for example, GNSS signals) for detecting the position at current time (current position) of the vehicle 10. The map database stores road map information and the like. The position information acquisition device 33 acquires the current position (for example, longitude and latitude) of the vehicle 10 based on GNSS signals and is, for example, a navigation system.

The ECU 30 acquires the travel direction Td of the vehicle 10 at current time based on a history of current positions acquired by the position information acquisition device 33. GNSS signals include a movement speed. The ECU 30 determines a vehicle speed V1 that is the speed of the vehicle 10 at a current point in time based on the movement speed included in the GNSS signals.

The wireless communication device 34 is a wireless communication terminal for communicating information with a cloud 40 via a network. The cloud 40 includes a management server 42 and one or more storage devices 44A, . . . , 44N, connected to the network. The one or more storage devices 44A, . . . , 44N are referred to as storage devices 44 when not distinguished from each other.

The management server 42 includes a CPU, ROM, RAM, an interface (I/F), and the like. The management server 42 finds and reads data stored in the storage devices 44 and writes data in the storage devices 44.

The storage devices 44 store preview reference data 45. An unsprung mass displacement $z_1$, a vehicle speed V1, and position information, acquired when the vehicle 10 has actually traveled on a road surface, are stored in the preview reference data 45 in association with one another. In other words, the vehicle 10 sends the position of each wheel 11 of the moving vehicle 10, an actual value (a method of acquiring the actual value will be described later) of unsprung mass displacement $z_1$ at the position of the wheel 11, and a vehicle speed V1 of the vehicle 10 at the position of the wheel 11 to the management server 42 in association with one another, and the management server 42 stores the data in the storage devices 44 as the preview reference data 45.

Each unsprung mass 50 is displaced in the vertical direction upon receiving a displacement of a road surface when the vehicle 10 travels on the road surface. The unsprung mass displacements $z_1$ are displacements, in the vertical direction, of the unsprung masses 50 respectively corresponding to the positions of the wheels 11 of the vehicle 10. The position information indicates the position (for example, latitude and longitude) of each wheel 11 at which an unsprung mass displacement $z_1$ is acquired at time at which the unsprung mass displacement $z_1$ is acquired. The position of each wheel 11 is calculated based on the position of the vehicle 10 and the travel direction Td of the vehicle 10. FIG. 2 shows an unsprung mass displacement $z_1$ "$z_1a$", position information "Xa, Ya", and a vehicle speed V1 "V1a" as examples of the unsprung mass displacement $z_1$, vehicle speed V1, and position information, stored as the preview reference data 45. The vehicle speed V1 stored as the preview reference data 45 is an average value of the vehicle speeds V1 of the vehicles 10 having passed through the position indicated by the position information.

The ECU 30 is also connected to each of the right front wheel active actuator 17FR, the left front wheel active actuator 17FL, the right rear wheel active actuator 17RR, and the left rear wheel active actuator 17RL via a drive circuit (not shown).

The ECU 30 computes a target controlling force Fct for damping the vibration of the sprung mass 51 based on an unsprung mass displacement $z_1$ at an estimated passage position (described later) of each wheel 11 and controls the active actuator 17 such that, when the wheel 11 passes through the estimated passage position, the active actuator 17 generates a controlling force Fc corresponding to (equal to) the target controlling force Fct.

<Outline of Basic Preview Vibration Damping Control>

Hereinafter, the outline of basic preview vibration damping control executed by the vibration damping control apparatus 20 will be described. FIG. 3 is a single-wheel model of the vehicle 10 on a road surface 55.

A spring 52 corresponds to the suspension spring 16. A damper 53 corresponds to the shock absorber 15. An actuator 54 corresponds to the active actuator 17.

In FIG. 3, the mass of the sprung mass 51 is denoted by sprung mass $m_2$. A displacement, in the vertical direction, of the unsprung mass 50 is denoted by unsprung mass displacement $z_1$. A displacement, in the vertical direction, of the sprung mass 51 is denoted by sprung mass displacement $z_2$. The sprung mass displacement $z_2$ is a displacement, in the vertical direction, of the sprung mass 51 corresponding to the position of each wheel 11. The spring constant (equivalent spring constant) of the spring 52 is denoted by spring constant K. The damping coefficient (equivalent damping coefficient) of the damping coefficient of the damper 53 is denoted by damping coefficient C. A force generated by the actuator 54 is denoted by controlling force Fc.

The time derivatives of $z_1$ and $z_2$ are respectively denoted by $dz_1$ and $dz_2$, and the second order time derivatives of $z_1$ and $z_2$ are respectively denoted by $ddz_1$ and $ddz_2$. Hereinafter, it is defined that an upward displacement is positive for $z_1$ and $z_2$, and upward forces generated by the spring 52, the damper 53, the actuator 54, and the like are positive.

In the single-wheel model of the vehicle 10, shown in FIG. 3, the equation of motion for the motion of the sprung mass 51 in the vertical direction is expressed by the expression (1).

$$m_2 ddz_2 = C(dz_1 - dz_2) + K(z_1 - z_2) - Fc \tag{1}$$

It is assumed that the damping coefficient C in the expression (1) is constant. However, an actual damping coefficient varies depending on the stroke speed of the suspension 13, so the damping coefficient C may be, for example, set to a value that varies with a time derivative of the stroke H.

When the vibration of the sprung mass 51 is completely cancelled out by the controlling force Fc (that is, when each of the sprung mass acceleration $ddz_2$, the sprung mass velocity $dz_2$, and the sprung mass displacement $z_2$ is zero), the controlling force Fc is expressed by the expression (2).

$$Fc = Cdz_1 + Kz_1 \tag{2}$$

Therefore, the controlling force Fc for damping the vibration of the sprung mass 51 is expressed by the expression (3) where a control gain is $\alpha$. The control gain $\alpha$ is a selected constant greater than zero and less than or equal to one.

$$Fc = \alpha(Cdz_1 + Kz_1) \tag{3}$$

When the expression (3) is substituted into the expression (1), the expression (1) is expressed by the following expression (4).

$$m_2 ddz_2 = C(dz_1 - dz_2) + K(z_1 - z_2) - \alpha(Cdz_1 + Kz_1) \tag{4}$$

When Laplace transform is applied to the expression (4) to arrange the expression (4), the following expression (5) is obtained. In other words, a transfer function from an unsprung mass displacement $z_1$ to a sprung mass displacement $z_2$ is expressed by the expression (5). In the expression (5), "s" is a Laplace operator.

$$\frac{z_2}{z_1} = \frac{(1-a)(Cs + K)}{m_2 s^2 + Cs + K} \tag{5}$$

According to the expression (5), the transfer function varies depending on $\alpha$. When $\alpha$ is a selected value greater than zero and less than or equal to one, it is determined that the magnitude of the transfer function is definitely less than one (that is, the vibration of the sprung mass 51 is reduced). When $\alpha$ is one, the magnitude of the transfer function is zero, so it is confirmed that the vibration of the sprung mass 51 is completely cancelled out. Based on the expression (3), the target controlling force Fct is expressed by the following expression (6). In the expression (6), a gain $\beta_1$ corresponds to $\alpha C$, and a gain $\beta_2$ corresponds to $\alpha K$.

$$Fct = \beta_1 \times dz_1 + \beta_2 \times z_1 \tag{6}$$

Thus, the ECU 30 preliminary acquires (look ahead) an unsprung mass displacement $z_1$ at a position through which the wheel 11 passes in the future (estimated passage position) and computes a target controlling force Fct by applying the acquired unsprung mass displacement $z_1$ to the expression (6). Then, the ECU 30 causes the actuator 54 to generate a controlling force Fc corresponding to the target controlling force Fct at the timing at which the wheel 11 passes through the estimated passage position (that is, the timing at which the unsprung mass displacement $z_1$ applied to the expression (6) occurs). With this configuration, when the wheel 11 passes through the estimated passage position (that is, when the unsprung mass displacement $z_1$ applied to the expression (6) occurs), the vibration of the sprung mass 51 is reduced.

The target controlling force Fct may be computed based on the following expression (7) obtained by omitting the derivative term ($\beta_1 \times dz_1$) from the expression (6). In this case as well, the controlling force Fc ($= \beta_2 \times z_1$) for reducing the vibration of the sprung mass 51 is generated from the actuator 54, so the vibration of the sprung mass 51 is reduced as compared to when the controlling force Fc is not generated.

$$Fct = \beta_2 \times z_1 \tag{7}$$

Figure 4:
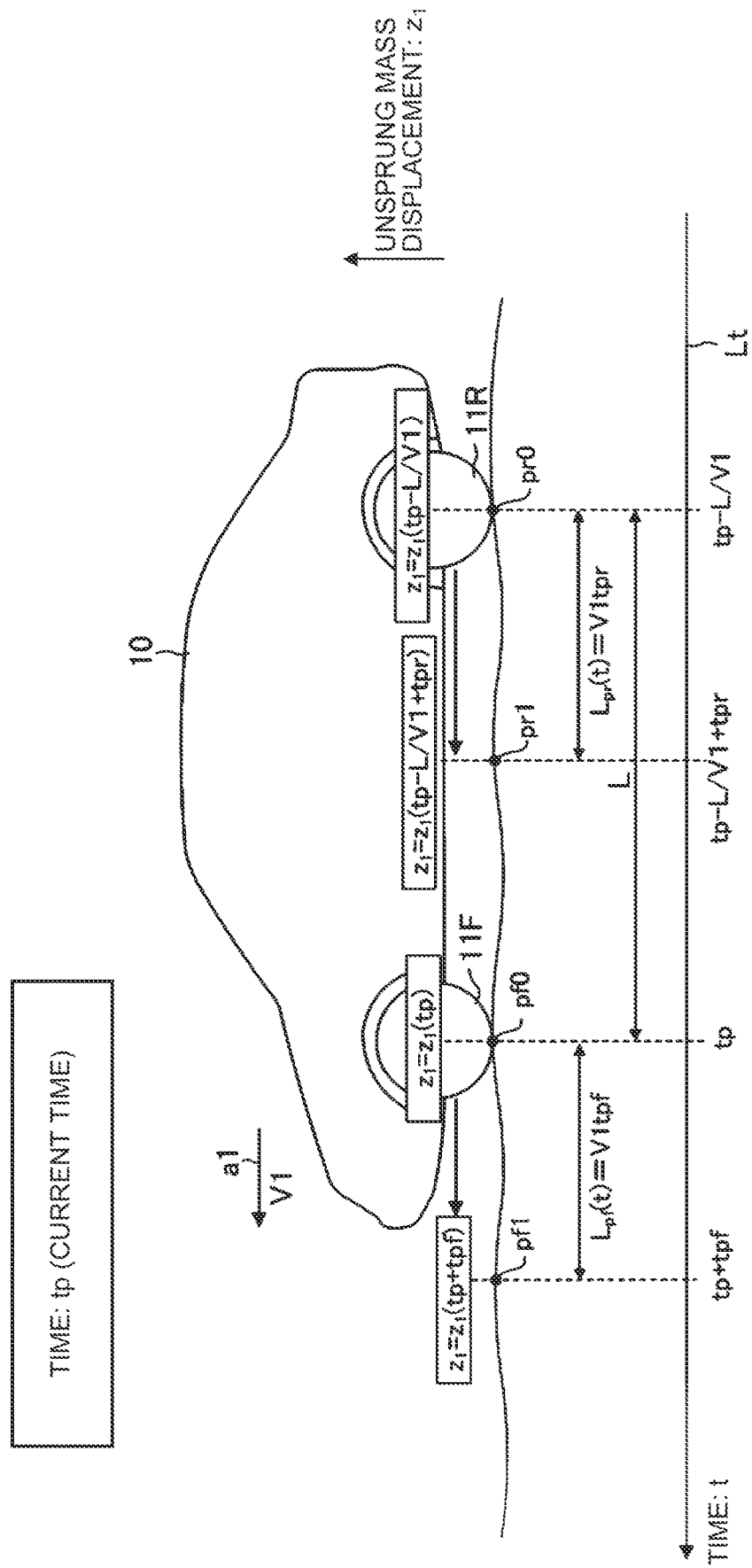
FIG. 4 is a view for illustrating preview vibration damping control.

Hereinafter, an example of the operation of the vibration damping control apparatus 20 will be described with reference to FIG. 4 to FIG. 6. FIG. 4 shows the vehicle 10 traveling at a vehicle speed V1 in a direction indicated by the arrow a1 at current time tp. In the following description, it is assumed that the front wheel 11F and the rear wheel 11R each are any one of the right and left wheels and the movement speed of each of the front wheel 11F and the rear wheel 11R is the same as the vehicle speed V1.

In FIG. 4, the line Lt is an imaginary time axis t. The unsprung mass displacement $z_1$ of the front wheel 11F on a movement trajectory at present time t, time t in the past, or time t in the future is expressed by a function $z_1(t)$ with respect to time t. Thus, the unsprung mass displacement $z_1$ of the front wheel 11F at a position (ground contact position) pf0 at current time tp is expressed by $z_1(tp)$. The unsprung mass displacement $z_1$ of the rear wheel 11R at a position (ground contact position) pr0 at current time tp is the unsprung mass displacement $z_1$ of the front wheel 11F at time tp−L/V1 that is earlier by a time (L/V1) taken by the front wheel 11F to move a wheel base length L than current time tp. Thus, the unsprung mass displacement $z_1$ of the rear wheel 11R at current time tp is expressed by $z_1(tp-L/V1)$.

Initially, preview vibration damping control for the front wheel 11F will be described. The ECU 30 determines an estimated passage position pf1 of the front wheel 11F after a lapse of a front wheel look-ahead time tpf from (behind) current time tp. The front wheel look-ahead time tpf is set in advance to a time required from when the ECU 30 determines the estimated passage position pf1 to when the front wheel active actuator 17F outputs a controlling force Fcf corresponding to a target controlling force Fcft.

The estimated passage position pf1 of the front wheel 11F is a position a front wheel look-ahead distance Lpf (=V1× tpf) away from the position pf0 at current time tp along an estimated front wheel movement trajectory that is a trajectory along which the front wheel 11F is estimated to move.

As will be described later, the position pf0 is calculated based on the current position of the vehicle 10, acquired by the position information acquisition device 33.

Incidentally, the ECU 30 acquires in advance part of preview reference data 45 in a region near the current position (preparatory section (described later)) of the vehicle 10 from the cloud 40. The ECU 30 acquires an unsprung mass displacement $z_1$(tp+tpf) based on the determined estimated passage position pf1 and part of the preview reference data 45 acquired in advance.

The ECU 30 may acquire the unsprung mass displacement $z_1$(tp+tpf) as follows. Initially, the ECU 30 sends the determined estimated passage position pf1 to the cloud 40. The cloud 40 acquires an unsprung mass displacement $z_1$(tp+tpf) associated with position information indicating the estimated passage position pf1, based on the estimated passage position pf1 and the preview reference data 45. The cloud 40 sends the unsprung mass displacement $z_1$(tp+tpf) to the ECU 30.

The ECU 30 computes a target controlling force Fcft (=βf×$z_1$(tp+tpf)) by applying the unsprung mass displacement $z_1$(tp+tpf) to the unsprung mass displacement $z_1$ of the following expression (8).

$$Fcft = \beta f \times z_1 \qquad (8)$$

The ECU 30 sends a control command including the target controlling force Fcft to the front wheel active actuator 17F such that the front wheel active actuator 17F generates a controlling force Fcf corresponding to (equal to) the target controlling force Fcft.

Figure 5:
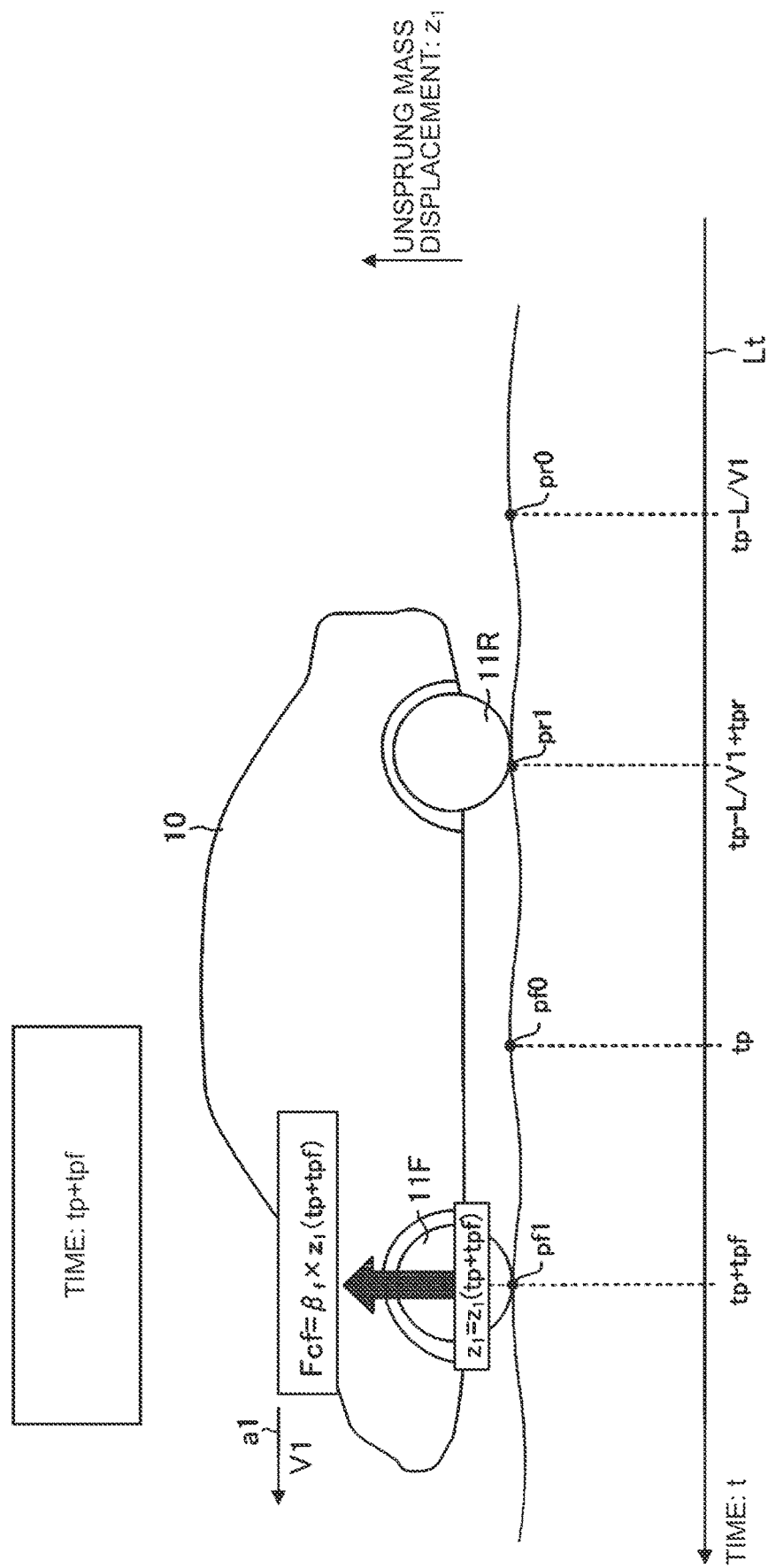
FIG. 5 is a view for illustrating preview vibration damping control.

As shown in FIG. 5, the front wheel active actuator 17F generates the controlling force Fcf corresponding to the target controlling force Fcft at time tp+tpf after a lapse of the front wheel look-ahead time tpf from current time tp (that is, the timing at which the front wheel 11F actually passes through the estimated passage position pf1). Thus, the front wheel active actuator 17F generates the controlling force Fcf at appropriate timing for appropriately damping the vibration of the sprung mass 51 resulting from the unsprung mass displacement $z_1$ of the front wheel 11F at the estimated passage position pf1.

Initially, preview vibration damping control for the rear wheel 11R will be described. The ECU 30 determines an estimated passage position pr1 of the rear wheel 11R after a lapse of a rear wheel look-ahead time tpr from (behind) current time tp. The rear wheel look-ahead time tpr is set in advance to a time required from when the ECU 30 determines the estimated passage position pr1 to when the rear wheel active actuator 17R outputs a controlling force Fcr corresponding to a target controlling force Fcrt.

When the front wheel active actuator 17F and the rear wheel active actuator 17R are different active actuators, the front wheel look-ahead time tpf and the rear wheel look-ahead time tpr are set in advance to different values. When the front wheel active actuator 17F and the rear wheel active actuator 17R are the same active actuators, the front wheel look-ahead time tpf and the rear wheel look-ahead time tpr are set in advance to the same value.

The ECU 30 determines a position a rear wheel look-ahead distance Lpr (=V1×tpr) away from the position pr0 at current time tp along an estimated movement trajectory of the rear wheel 11R when it is assumed that the rear wheel 11R follows the same trajectory as the front wheel 11F, as the estimated passage position pr1. As will be described in detail later, the position pr0 is calculated based on the current position of the vehicle 10, acquired by the position information acquisition device 33.

The unsprung mass displacement $z_1$ at the estimated passage position pr1 is an unsprung mass displacement $z_1$ after a lapse of the rear wheel look-ahead time tpr from time (tp−L/V1) at which the front wheel 11F is located at the position pr0 of the rear wheel 11R at current time, so the unsprung mass displacement $z_1$ is expressed by $z_1$(tp−L/V1+tpr).

The ECU 30 acquires the unsprung mass displacement $z_1$(tp−L/V1+tpr) based on the determined estimated passage position pr1 and part of the preview reference data 45 acquired in advance.

The ECU 30 may acquire the unsprung mass displacement $z_1$(tp−L/V1+tpr) as follows. Initially, the ECU 30 sends the determined estimated passage position pr1 to the cloud 40. The cloud 40 acquires an unsprung mass displacement $z_1$(tp−L/V1+tpr) associated with position information indicating the estimated passage position pr1, based on the estimated passage position pr1 and the preview reference data 45. The cloud 40 sends the unsprung mass displacement $z_1$(tp−L/V1+tpr) to the ECU 30.

The ECU 30 computes a target controlling force Fcrt (=βr×$z_1$(tp−L/V1+tpr)) by applying the unsprung mass displacement $z_1$(tp−L/V1+tpr) to the unsprung mass displacement $z_1$ of the following expression (9). The gain βf in the expression (8) and the gain βr in the expression (9) are set to values different from each other. This is because the spring constant Kf of the right front wheel suspension 13FR and left front wheel suspension 13FL is different from the spring constant Kr of the right rear wheel suspension 13RR and left rear wheel suspension 13RL. When the gains βf, βr are not distinguished from each other, the gains βf, βr may be referred to as gains β.

$$Fcrt = \beta r \times z_1 \qquad (9)$$

The ECU 30 sends a control command including the target controlling force Fcrt to the rear wheel active actuator 17R such that the rear wheel active actuator 17R generates a controlling force Fcr corresponding to (equal to) the target controlling force Fcrt.

Figure 6:
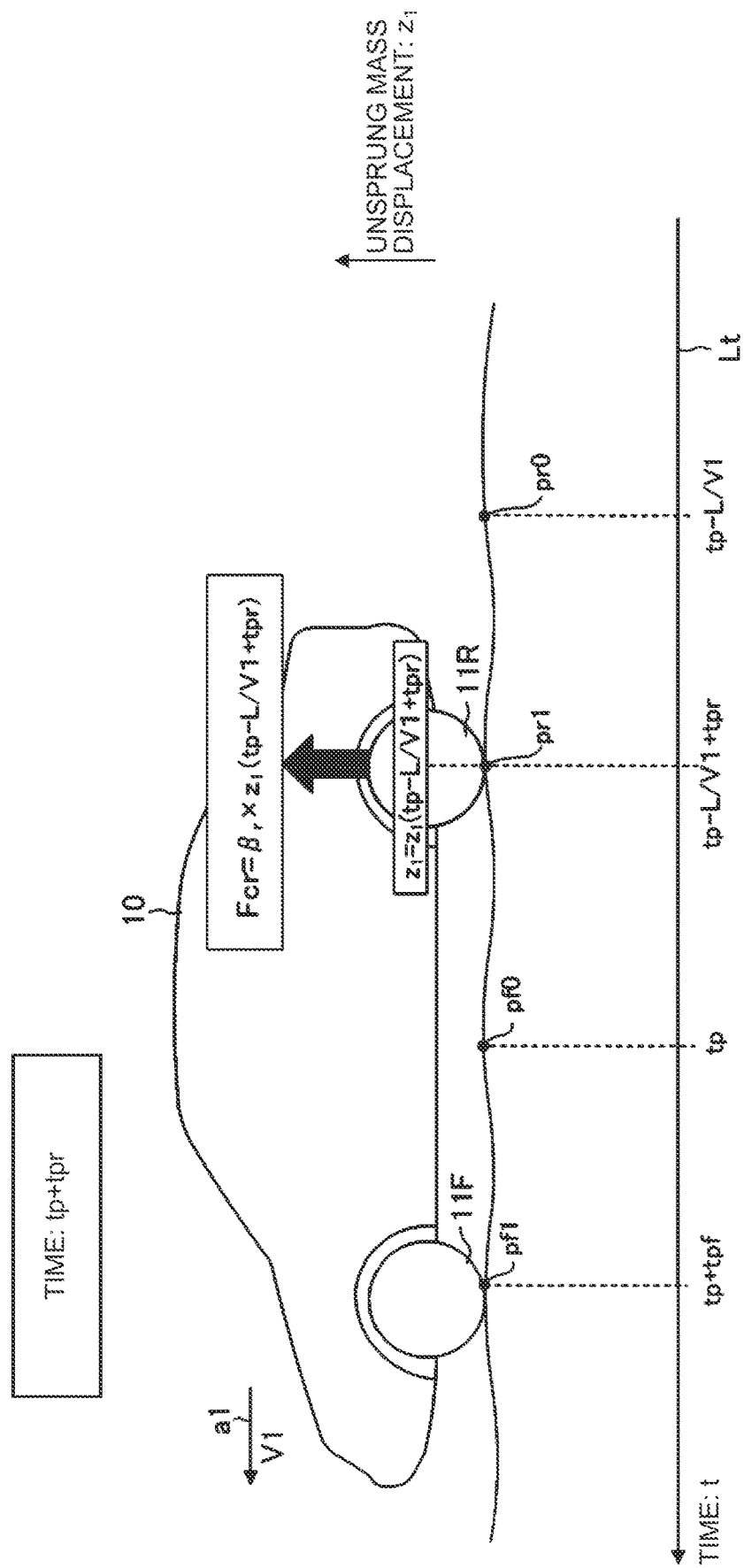
FIG. 6 is a view for illustrating preview vibration damping control.

As shown in FIG. 6, the rear wheel active actuator 17R generates the controlling force Fcr corresponding to the target controlling force Fcrt at time tp+tpr after a lapse of the rear wheel look-ahead time tpr from current time tp (that is, the timing at which the rear wheel 11R actually passes through the estimated passage position pr1). Thus, the rear wheel active actuator 17R generates the controlling force Fcr at appropriate timing for appropriately damping the vibration of the sprung mass 51 resulting from the unsprung mass displacement $z_1$ of the rear wheel 11R at the estimated passage position pr1.

Vibration damping control over the sprung mass 51 is described above. Such vibration damping control over the sprung mass 51 is referred to as preview vibration damping control.

Overview of Operation

Hereinafter, the outline of the operation of the vibration damping control apparatus 20 will be described. The ECU 30 of the vibration damping control apparatus 20 acquires the absolute values of unsprung mass displacements $z_1$ (a plurality of unsprung mass displacements $z_1$) associated with pieces of position information corresponding to positions in a predetermined sampling section Ssmp including the estimated passage positions of the wheels 11 from the preview reference data 45 as sampling displacements $z_1$smp. The ECU 30 determines that a sprung mass resonance condition is satisfied when the sampling displacements $z_1$smp satisfy a predetermined condition (described later).

The sprung mass resonance condition is satisfied when the sprung mass 51 of the vehicle 10 is highly likely to have been resonating at the time when the wheel 11 of the vehicle 10 passes through the estimated passage position in the past and the vehicle 10 acquires the unsprung mass displacement $z_1$ at the estimated passage position.

When the sprung mass resonance condition is not satisfied, the ECU 30 computes a target controlling force Fct based on the unsprung mass displacement $z_1$ at the estimated passage position, acquired from the preview reference data 45. In contrast, when the sprung mass resonance condition is satisfied, the ECU 30 computes a target controlling force Fct based on a value less than the unsprung mass displacement $z_1$ at the estimated passage position, acquired from the preview reference data 45.

Since a deflection of the tire increases while the sprung mass 51 is resonating, an unsprung mass displacement $z_1$ when the sprung mass 51 is resonating is highly likely to be greater than an unsprung mass displacement $z_1$ having a correlation with a road surface displacement $z_0$. The preview reference data 45 may include such an excessive unsprung mass displacement $z_1$. When the unsprung mass displacement $z_1$ at the estimated passage position, acquired from the preview reference data 45, is an excessive unsprung mass displacement $z_1$, a target controlling force Fct computed based on the unsprung mass displacement $z_1$ is greater than an ideal controlling force that is a controlling force ideal for a road surface displacement $z_0$ at the estimated passage position, with the result that the vibration damping performance of preview vibration damping control decreases.

For this reason, in the present embodiment, as described above, when the sprung mass resonance condition is satisfied, a target controlling force Fct is computed based on a value less than the unsprung mass displacement $z_1$ at the estimated passage position, acquired from the preview reference data 45. Thus, even when the sprung mass 51 of the vehicle 10 has been resonating at a point in time at which the unsprung mass displacement $z_1$ at the estimated passage position is acquired, it is possible to reduce the possibility that the target controlling force Fct is greater than an ideal controlling force, and it is possible to reduce the possibility that the vibration damping performance of preview vibration damping control decreases.

The above-described predetermined condition will be described below. The ECU 30 acquires vehicle speeds V1 (a plurality of vehicle speeds V1) associated with pieces of position information corresponding to a plurality of positions included in the sampling section Ssmp from the preview reference data 45. The ECU 30 acquires the average value of the vehicle speeds V1 as a sampling vehicle speed V1. Subsequently, the ECU 30 computes a time-series change in the sampling displacement $z_1$smp when the vehicle 10 has traveled over the sampling section Ssmp at the sampling vehicle speed V1.

The ECU 30 computes a first component value MG1 indicating the magnitude of a time-series change in sampling displacement $z_1$smp in a first frequency band FB1. As an example, the ECU 30 computes a moving average of the sampling displacement $z_1$smp in the first frequency band FB1 as the first component value MG1. The ECU 30 also computes a second component value MG2 indicating the magnitude of a time-series change in sampling displacement $z_1$smp in a second frequency band FB2. As an example, as in the case of the first component value MG1, the ECU 30 computes a moving average of the sampling displacement $z_1$smp in the second frequency band FB2 as the second component value MG2. Subsequently, the ECU 30 computes the ratio RT of the first component value MG1 to the second component value MG2. The ratio RT is a value used to determine whether the sprung mass resonance condition is satisfied and may be referred to as evaluation value.

The first frequency band FB1 is a frequency band from a frequency f1 to a frequency f2 (f2>f1) (hereinafter, which may be referred to as low frequency band) and is a band including a preset sprung mass resonant frequency of the vehicle 10. The second frequency band FB2 is a frequency band from the frequency f2 to a frequency f3 (f3>f2) (hereinafter, which may be referred to as high frequency band) and is a band including frequencies higher than the sprung mass resonant frequency.

When the ratio RT is higher than or equal to a predetermined threshold ratio RTth (when the relation between an evaluation value and a threshold satisfies a preset condition), the ECU 30 determines that the sampling displacements $z_1$smp satisfy the predetermined condition and the sprung mass resonance condition is satisfied (that is, when, before a current point in time, the vehicle 10 passes through an estimated passage position and acquires an unsprung mass displacement $z_1$ at the estimated passage position, the ECU 30 determines that the sprung mass 51 of the vehicle 10 is highly likely to have been resonating). In this case, the unsprung mass displacement $z_1$ at the estimated passage position, acquired from the preview reference data 45, is highly likely to be an excessive unsprung mass displacement $z_1$, so a value less than the unsprung mass displacement $z_1$ needs to be used to compute a target controlling force Fct. In contrast, when the ratio RT is lower than the threshold ratio RTth (when the relation between an evaluation value and a threshold does not satisfy the preset condition), the ECU 30 determines that the sampling displacements $z_1$smp do not satisfy the predetermined condition and the sprung mass resonance condition is not satisfied.

Figure 7:
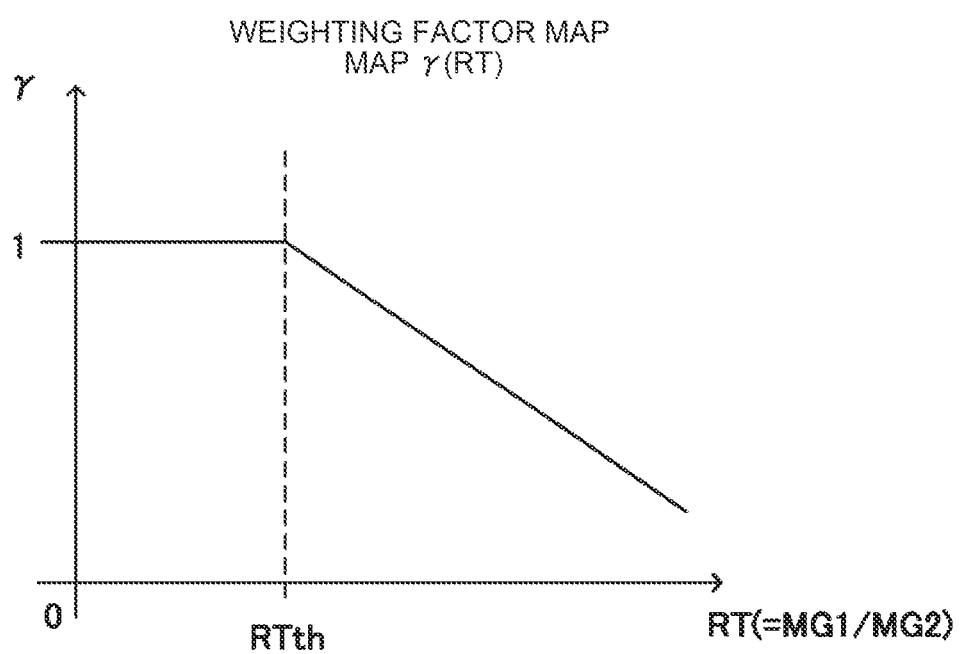
FIG. 7 is a view for illustrating a weighting factor map.

Here, a weighting factor map MAPγ(RT) shown in FIG. 7 is stored in the ROM of the ECU 30. The weighting factor map MAPγ(RT) defines the relation between the ratio RT and a weighting factor γ. More specifically, according to the weighting factor map MAPγ(RT), the weighting factor γ is one when the ratio RT is higher than zero and lower than the threshold ratio RTth, and, when the ratio RT is higher than or equal to the threshold ratio RTth, the weighting factor γ gradually reduces from one in the range of zero to one with an increase in the ratio RT.

The ECU 30 acquires a weighting factor γ by applying the ratio RT to the weighting factor map MAPγ(RT), computes a target controlling force Fcft of the front wheel 11F based on the following expression (10), and computes a target controlling force Fcrt of the rear wheel 11R based on the following expression (11).

$$Fcft = \gamma \times \beta f \times z_1 \qquad (10)$$

$$Fcrt = \gamma \times \beta r \times z_1 \qquad (11)$$

In the expression (10) and the expression (11), γ denotes the weighting factor γ.

According to the weighting factor map MAPγ(RT), when the ratio RT is lower than the threshold ratio RTth (that is, when the sprung mass resonance condition is not satisfied, the ECU 30 computes a target controlling force Fct by using the weighting factor γ of which the value is one. In other words, the ECU 30 computes a target controlling force Fct based on an unsprung mass displacement $z_1$ at an estimated passage position, acquired from the preview reference data 45.

In contrast, according to the weighting factor map MAPγ (RT), when the ratio RT is higher than or equal to the threshold ratio RTth (that is, when the sprung mass resonance condition is satisfied), the ECU 30 computes a target controlling force Fct by using the weighting factor γ of which the value is less than one. In other words, the ECU 30 computes a target controlling force Fct based on a value less than an unsprung mass displacement $z_1$ at an estimated passage position, acquired from the preview reference data 45. Therefore, even when an unsprung mass displacement $z_1$ acquired at an estimated passage position is an excessive unsprung mass displacement $z_1$ due to the fact that the sprung mass 51 of the vehicle 10 has been resonating at the time when the vehicle 10 passes through the estimated passage position before a current point in time and acquires the unsprung mass displacement $z_1$ at the estimated passage position, it is possible to reduce the possibility that the vibration damping performance of preview vibration damping control decreases according to the present embodiment.

(Specific Operation)

<Preview Vibration Damping Control Routine>

The CPU of the ECU 30 (hereinafter, when referred to CPU, it indicates the CPU of the ECU 30 unless otherwise specified) executes a preview vibration damping control routine shown by the flowchart in FIG. 8 each time a predetermined period of time elapses.

Figure 8:
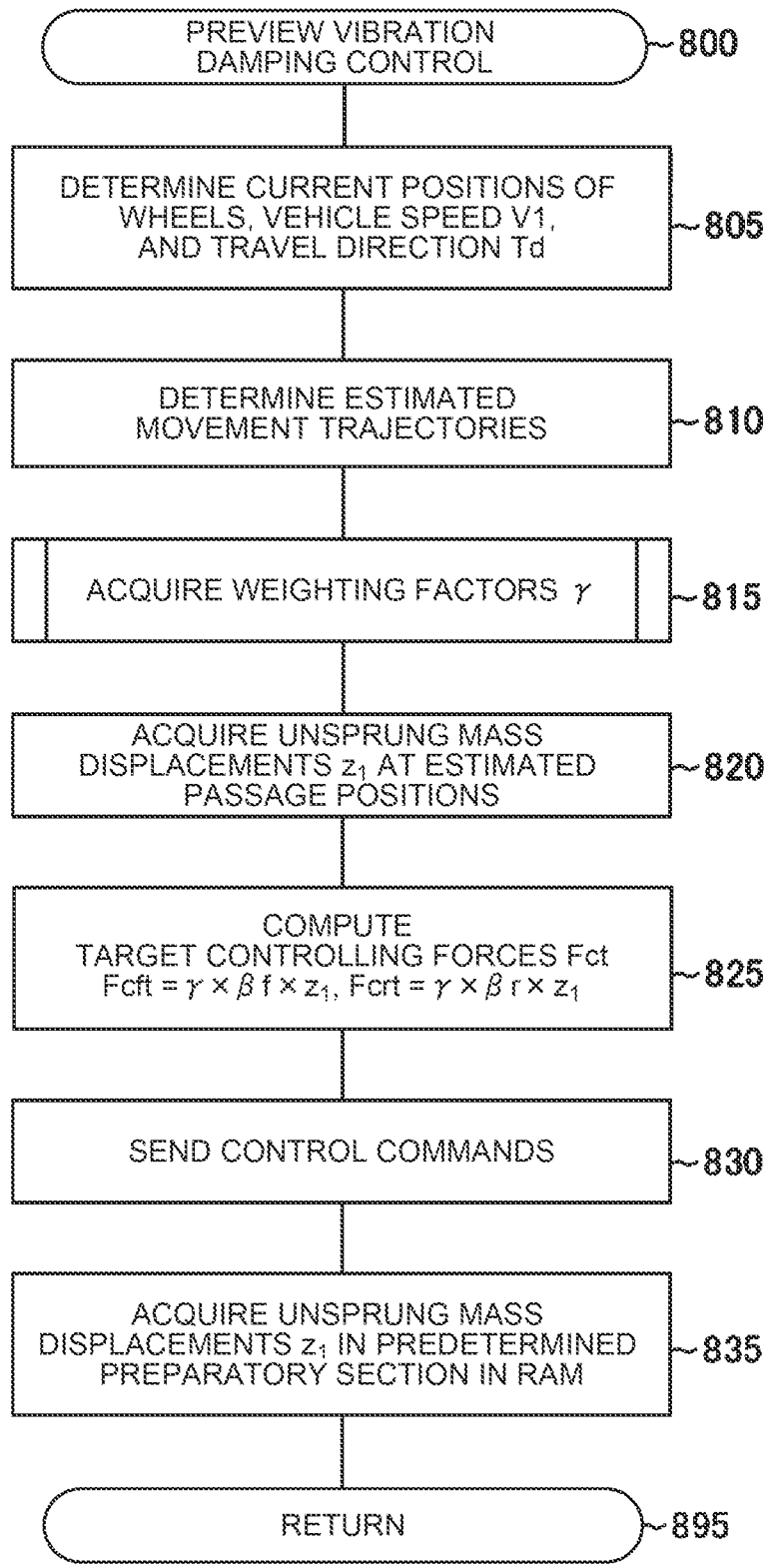
FIG. 8 is a flowchart showing a routine to be executed by a CPU of an electronic control unit.

Therefore, when predetermined timing comes, the CPU starts a process from step 800 of FIG. 8 and executes step 805, step 810, step 815, step 820, step 825, step 830, and step 835 in this order, then proceeds to step 895 and once ends the routine.

In step 805, the CPU acquires information on the current position of the vehicle 10 from the position information acquisition device 33 and determines (acquires) the current positions of the wheels 11, the vehicle speed V1, and the travel direction Td of the vehicle 10.

More specifically, the CPU maps a last current position and a present current position in the road map information included in the map database and determines the direction from the last current position toward the present current position as the travel direction Td of the vehicle 10. The last current position means the current position of the vehicle 10, acquired by the CPU in step 805 of the routine executed last time. The present current position means the current position of the vehicle 10, acquired by the CPU in step 805 this time.

Position relation data indicating the relation between an installation position of the GNSS receiver and the positions of the wheels 11 in the vehicle 10 is prestored in the ROM of the ECU 30. Since the current position of the vehicle 10, acquired from the position information acquisition device 33, corresponds to the installation position of the GNSS receiver, the CPU determines the current positions of the wheels 11 by consulting the current position of the vehicle 10, the travel direction Td of the vehicle 10, and the position relation data. GNSS signals received by the position information acquisition device 33 include information on a movement speed, and the CPU determines the vehicle speed V1 based on the GNSS signals.

In step 810, the CPU determines an estimated front wheel movement trajectory and an estimated rear wheel movement trajectory as will be described below. The estimated front wheel movement trajectory is a trajectory along which the front wheel 11F is estimated to move from this time. The estimated rear wheel movement trajectory is a trajectory along which the rear wheel 11R is estimated to move from this time. As an example, the CPU determines an estimated front wheel movement trajectory and an estimated rear wheel movement trajectory based on the current positions of the wheels 11, the travel direction Td of the vehicle 10, and the position relation data.

In step 815, the CPU executes a weighting factor acquisition routine for acquiring a weighting factor γ. The details of the weighting factor acquisition routine will be described with reference to FIG. 9. In step 820, the CPU acquires the unsprung mass displacements $z_1$ at an estimated front wheel passage position pf1 and an estimated rear wheel passage position pr1 from the preview reference data 45 (see step 835 (described later)) acquired in advance from the cloud 40. The unsprung mass displacements $z_1$ acquired in step 820 may be referred to as preview displacements $z_1$.

In step 825, the CPU computes target controlling forces Fct of the active actuators 17 by applying the weighting factor γ and the unsprung mass displacement $z_1$ at the estimated front wheel passage position pf1 to the expression (10) and applying the weighting factor γ and the unsprung mass displacement $z_1$ at the estimated rear wheel passage position pr1 to the expression (11). In step 830, the CPU sends a control command including the target controlling force Fct to each of the active actuators 17.

In step 835, when the estimated front wheel passage position pf1 reaches a position a predetermined distance before an end point of the preparatory section, the CPU acquires the unsprung mass displacements $z_1$ and the pieces of position information in the preparatory section having a start point at the estimated front wheel passage position pf1 from the preview reference data 45 of the cloud 40 and stores the acquired unsprung mass displacements $z_1$ and pieces of position information in the RAM. The preparatory section is a section of which the start point is set to the estimated passage position pf1 that has reached the start point of the preparatory section and the end point is set to a position a predetermined preparatory distance away from the estimated passage position pf1 along the estimated front wheel movement trajectory. The preparatory distance is determined in advance to a value sufficiently greater than the front wheel look-ahead distance Lpf.

Here, the details of the process of step 835 will be described. The CPU sends an acquisition request including the position information of the preparatory section from the wireless communication device 34 to the management server 42. The management server 42 acquires the unsprung mass displacements $z_1$ and the vehicle speeds V1, associated with the pieces of position information corresponding to the positions in the preparatory section included in the acquisition request from the preview reference data 45 and sends the pieces of position information, the unsprung mass displacements $z_1$, and the vehicle speeds V1 to the vibration damping control apparatus 20. When the vibration damping control apparatus 20 receives the position information, the unsprung mass displacements $z_1$, and the vehicle speeds V1, the CPU stores the received position information, unsprung mass displacements $z_1$, and vehicle speeds V1 in the RAM.

<Weighting Factor Acquisition Routine>

Figure 9:
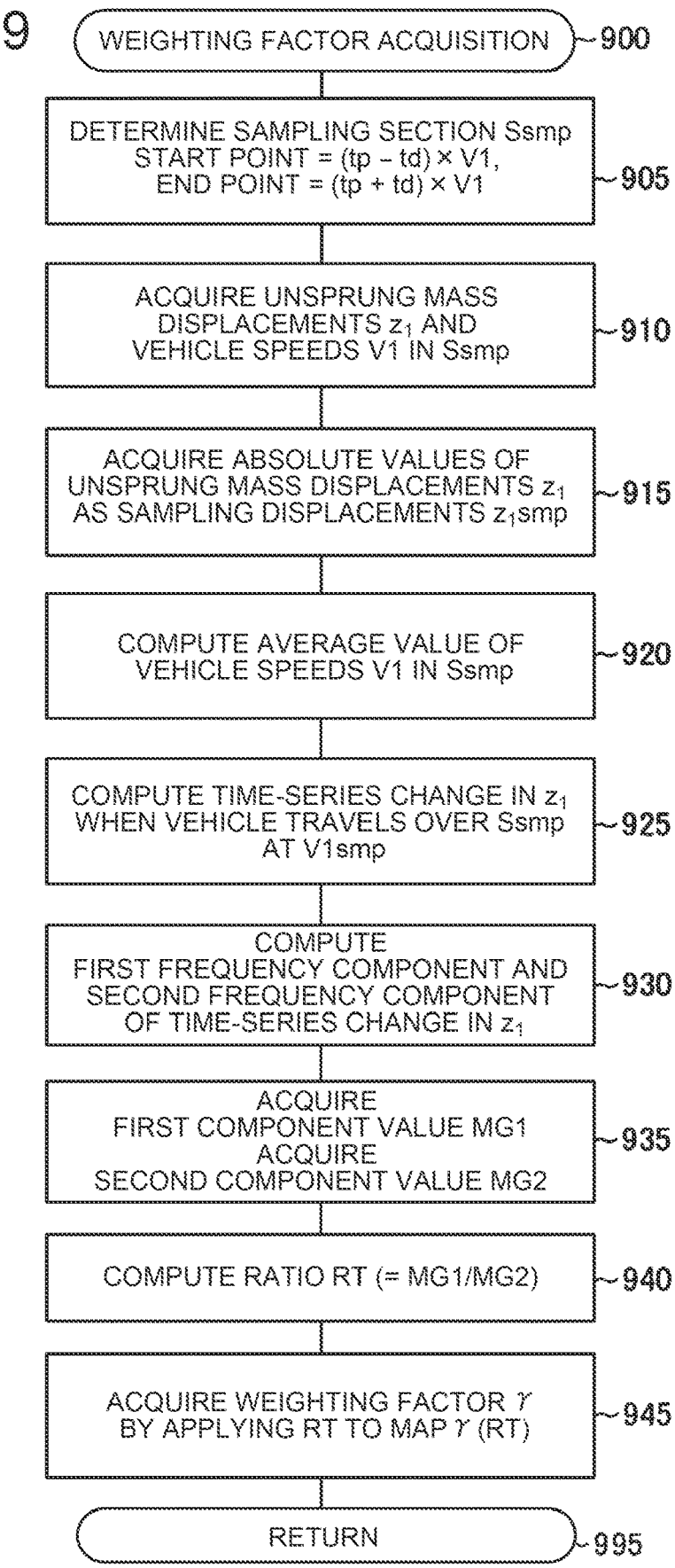
FIG. 9 is a flowchart showing a sub-routine to be executed by the CPU of the electronic control unit in acquiring a weighting factor in the routine shown in FIG. 8.

When the CPU proceeds to step 815 shown in FIG. 8, the CPU starts the process of the weighting factor acquisition routine shown by the flowchart in FIG. 9, from step 900, executes step 905, step 910, step 915, step 920, step 925, step 930, step 935, step 940, and step 945, proceeds to step 995, once ends the routine, and proceeds to step 820 shown in FIG. 8.

In step 905, the CPU determines a sampling section Ssmp including an estimated passage position through which each wheel 11 passes at a point in time after a lapse of a look-ahead time (a front wheel look-ahead time tpf or a rear wheel look-ahead time tpr) from a current point in time. More specifically, the CPU determines a point where each wheel 11 has travelled a first distance L1 (described later) along a corresponding estimated movement trajectory from the current position of the wheel 11 as a start point of the sampling section Ssmp. The CPU also determines a point where each wheel 11 has travelled a second distance L2 (described later) along a corresponding estimated movement trajectory from the current position of the wheel 11 as an end point of the sampling section Ssmp. The CPU computes the first distance L1 based on the following expression (12) and computes the second distance L2 based on the following expression (13).

$$L1 = (tp-td) \times V1 \quad (12)$$

$$L2 = (tp+td) \times V1 \quad (13)$$

In the expression (12) and the expression (13), td denotes a predetermined period of time.

In step 910, the CPU acquires the unsprung mass displacements $z_1$ and the vehicle speeds V1, associated with pieces of position information corresponding to the positions included in the sampling section Ssmp, from the unsprung mass displacements $z_1$ and the vehicle speeds V1 in the preparatory section, acquired in advance from the preview reference data 45 of the cloud 40.

In step 915, the CPU computes the absolute values of the unsprung mass displacements $z_1$ in the sampling section Ssmp as sampling displacements $z_1$smp. In step 920, the CPU computes the average value of the vehicle speeds V1 in the sampling section Ssmp as a sampling vehicle speed V1smp. In step 925, the CPU computes a time-series change in the sampling displacement $z_1$smp when the vehicle 10 travels over the sampling section Ssmp at the sampling vehicle speed V1smp based on the sampling displacements $z_1$smp and the sampling vehicle speed V1smp.

In step 930, the CPU acquires sampling displacements $z_1$smp in the first frequency band FB1 (hereinafter, referred to as first sampling displacements $z_1$smp) and sampling displacements $z_1$smp in the second frequency band FB2 (hereinafter, referred to as second sampling displacements $z_1$smp) from the time-series change in the sampling displacement $z_1$smp. More specifically, the CPU acquires the first sampling displacements $z_1$smp by executing a bandpass filtering process of passing only the first frequency band FB1 over the time-series change in the sampling displacement $z_1$spm. Similarly, the CPU acquires the second sampling displacements $z_1$smp by executing a bandpass filtering process of passing only the second frequency band FB2 over the time-series change in the sampling displacement $z_1$spm.

In step 935, the CPU computes a moving average of the first sampling displacements $z_1$smp as a first component value MG1 indicating the magnitude of the first sampling displacement $z_1$smp and computes the moving average of the second sampling displacements $z_1$smp as a second component value MG2 indicating the magnitude of the second sampling displacement $z_1$smp. In step 940, the CPU computes the ratio RT (=MG1/MG2) of the first component value MG1 to the second component value MG2.

In step 945, the CPU acquires a weighting factor γ by applying the ratio RT to the weighting factor map MAPγ (RT). As described above, when the ratio RT is lower than the threshold ratio RTth (that is, when the sprung mass resonance condition is not satisfied), the CPU acquires a weighting factor γ of which the value is one from the weighting factor map MAPγ(RT). Therefore, the target controlling force Fcft of the front wheel 11F, computed in step 825 shown in FIG. 8, is a value obtained by multiplying the gain βf by the unsprung mass displacement $z_1$ at the estimated passage position, acquired from the preview reference data 45, and the target controlling force Fcrt of the rear wheel 11R, computed in step 825 shown in FIG. 8, is a value obtained by multiplying the gain βr by the unsprung mass displacement $z_1$ at the estimated passage position, acquired from the preview reference data 45.

In contrast, when the ratio RT is higher than or equal to the threshold ratio RTth (that is, when the sprung mass resonance condition is satisfied), the CPU acquires a weighting factor γ, of which the value is greater than zero and less than one, from the weighting factor map MAPγ(RT). Therefore, the target controlling force Fcft computed in step 825 shown in FIG. 8 is a value less than a value obtained by multiplying the gain βf by the unsprung mass displacement $z_1$ at the estimated passage position, acquired from the preview reference data 45, and the target controlling force Fcrt is also a value less than a value obtained by multiplying the gain βr by the unsprung mass displacement $z_1$ at the estimated passage position, acquired from the preview reference data 45. Thus, when the unsprung mass displacement $z_1$ at the estimated passage position is highly likely to be an excessive unsprung mass displacement $z_1$ due to the fact that the sprung mass 51 has been resonating, it is possible to reduce the possibility that the target controlling force Fct is greater than an ideal controlling force, so it is possible to reduce the possibility that the vibration damping performance of preview vibration damping control decreases.

The CPU may acquire the first component value MG1 and the second component value MG2 by executing the following process instead of executing step 930 and step 935. In other words, the CPU may apply fast Fourier transform (FFT) to sampling displacements $z_1$smp, compute a moving average of spectra in the first frequency band FB1 as a first component value MG1, and compute a moving average of spectra in the second frequency band FB2 as a second component value MG2.

Alternatively, the CPU may compute a value obtained by integrating the first sampling displacements $z_1$smp as a first component value MG1 in step 935. Similarly, the CPU may compute a value obtained by integrating the second sampling displacements $z_1$smp as a second component value MG2. When the CPU performs FFT, the CPU may compute a value obtained by integrating the spectra in the first frequency band FB1 as a first component value MG1 and compute a value obtained by integrating the spectra in the second frequency band FB2 as a second component value MG2.

In the weighting factor map MAPγ(RT), only the relation between a weighting factor γ and a ratio RT higher than or equal to the threshold ratio RTth may be defined without defining the relation between a weighting factor γ and a ratio RT lower than the threshold ratio RTth. In this case, when the CPU computes the ratio RT in step 940, the CPU determines whether the ratio RT is higher than or equal to the threshold ratio RTth. When the ratio RT is higher than or equal to the threshold ratio RTth, the CPU proceeds to step 945 and acquires a weighting factor γ from the weighting factor map MAPγ(RT). On the other hand, when the ratio RT is less than the threshold ratio RTth, the CPU sets the weighting factor γ of which the value is one.

<Unsprung Mass Displacement Sampling Routine>

The CPU of the ECU 30 executes an unsprung mass displacement sampling routine shown by the flowchart in FIG. 10 each time a predetermined period of time elapses. This routine is executed for each of the wheels.

Therefore, when predetermined timing comes, the CPU starts a process from step 1000 of FIG. 10 and executes step 1005, step 1010, step 1015, step 1025, step 1030, and step 1035 in this order, then proceeds to step 1095 and once ends the routine.

In step 1005, the CPU acquires a sprung mass acceleration $ddz_2$ from the vertical acceleration sensor 31. In step 1010, the CPU computes a sprung mass displacement $z_2$ by evaluating a second-order integral of the sprung mass acceleration $ddz_2$ acquired in step 1005. In step 1015, the CPU acquires a stroke H from the stroke sensor 32. A stroke H is a suspension stroke in the vertical direction at the position of the wheel 11 and corresponds to a value obtained by subtracting an unsprung mass displacement $z_1$ from a sprung mass displacement $z_2$. In step 1025, the CPU computes an unsprung mass displacement $z_1$ by subtracting the stroke H from the sprung mass displacement $z_2$.

In step 1030, the CPU determines the vehicle speed V1 of the vehicle 10 at a current point in time and the current position of the wheel 11. A manner of determining the vehicle speed V1 and the current position of the wheel 11 is the same as that of step 805, so the description thereof is omitted.

In step 1035, the CPU stores the unsprung mass displacement $z_1$, the vehicle speed V1, and the current position (position information) of the wheel 11 in the storage device 30a in association with current time. The CPU may store a set of the unsprung mass displacement $z_1$, the vehicle speed V1, and the current position of the wheel 11 in the storage device 30a in association with one another.

<Sampled Data Sending>

The CPU of the ECU 30 executes a sampled data sending routine shown by the flowchart in FIG. 11 each time a predetermined period of time elapses.

Therefore, when predetermined timing comes, the CPU starts a process of step 1100 of FIG. 11 and executes step 1105 and step 1110 in this order.

In step 1105, the CPU adds one to the value of a send timer Ts. The send timer Ts is a timer for counting a time elapsed from a point in time at which sampled data is sent to the cloud 40 last time (hereinafter, referred to as last send time point).

In step 1110, the CPU determines whether the value of the send timer Ts is greater than or equal to a threshold Tsth (positive constant). When the value of the send timer Ts is less than the threshold Tsth, the CPU makes a negative determination in step 1110, proceeds to step 1195, and once ends the routine. On the other hand, when the value of the send timer Ts is greater than or equal to the threshold Tsth, the CPU makes an affirmative determination in step 1110 and executes step 1115, step 1120, and step 1125 in this order. After that, the CPU proceeds to step 1195 and once ends the routine.

In step 1115, the CPU associates the unsent unsprung mass displacement $z_1$, vehicle speed V1, and position information indicating the current position of the wheel 11 with one another based on time information. When the unsprung mass displacement $z_1$, vehicle speed V1, and position information are stored in association with one another, the CPU just reads out the data. In step 1120, the CPU sends the unsprung mass displacement $z_1$, vehicle speed V1, and position information, associated with one another in step 1115, to the cloud 40 as sampled data. In step 1125, the CPU sets the value of the send timer Ts to zero.

When the management server 42 of the cloud 40 receives the sampled data sent in step 1120, the management server 42 writes the sampled data in the preview reference data 45 stored in the storage device 44. When the unsprung mass displacement $z_1$ at the same position information has been already written in the preview reference data 45, the management server 42 overwrites the already written unsprung mass displacement $z_1$ with the unsprung mass displacement $z_1$ included in the newly received sampled data. However, the management server 42 may calculate an average value or weighted average value of the already written unsprung mass displacement $z_1$ and the unsprung mass displacement $z_1$ included in the newly received sampled data as a new unsprung mass displacement $z_1$ and write the calculated new unsprung mass displacement $z_1$ as the preview reference data 45. When the vehicle speed V1 at the same position information has been already written in the preview reference data 45, the management server 42 calculates an average value or weighted average value of the already written vehicle speed V1 and the vehicle speed V1 included in the newly received sampled data as a new vehicle speed V1 and writes the calculated new vehicle speed V1 as the preview reference data 45.

As is understood from the above, the unsprung mass displacement $z_1$ included in the preview reference data 45 is acquired based on the sprung mass acceleration $ddz_2$ detected by the vertical acceleration sensor 31. In other words, the unsprung mass displacement $z_1$ is acquired based on the acceleration of the sprung mass 51 (sprung mass acceleration $ddz_2$) that is actually displaced in the vertical direction by a displacement of a road surface on which the vehicle 10 actually travels (a motion state quantity of the sprung mass 51 in the vertical direction). For this reason, the unsprung mass displacement $z_1$ included in the preview reference data 45 is higher in accuracy for an actual road surface displacement $z_0$ than a road surface displacement $z_0$ acquired based on sensing data acquired by a preview sensor. Thus, preview vibration damping control is executed by using an unsprung mass displacement $z_1$ higher in accuracy for an actual road surface displacement $z_0$, so the vibration damping effect of preview vibration damping control is improved.

A dedicated sampling vehicle other than the vehicle 10 (ordinary vehicle) may sample an unsprung mass displacement $z_1$, vehicle speed V1, and a current position (position information) of each wheel at the time when actually traveling on a road surface and send the sampled unsprung mass displacement $z_1$, vehicle speed V1, and position information to the cloud 40 as sampled data. In this case, the first frequency band FB1 used by the CPU of the vibration damping control apparatus 20 of the vehicle 10 is set so as to include the sprung mass resonant frequency of an ordinary vehicle. In the example in which such a dedicated sampling vehicle sends sampled data, the CPU of the vibration damping control apparatus 20 does not need to execute the routines shown in FIG. 10 and FIG. 11. The dedicated sampling vehicle includes the vertical acceleration sensors 31FR, 31FL, 31RR, 31RL, the stroke sensors 32FR, 32FL, 32RR, 32RL, the position information acquisition device 33, the wireless communication device 34, and the storage device 30a, shown in FIG. 2, and executes the routines shown in FIG. 10 and FIG. 11.

The thus configured dedicated sampling vehicle sends sampled data to the cloud 40 one by one, and the cloud 40 updates the preview reference data 45 based on the sampled data. With this configuration, latest unsprung mass displacements $z_1$ for a road surface are stored in the preview reference data 45, so the vibration damping control apparatus 20 is capable of executing appropriate preview vibration damping control for a latest condition of a road surface.

Modification

The vibration damping control apparatus 20 of the present modification determines whether the sprung mass resonance condition is satisfied at the stage where the vehicle 10 travels on a road surface and acquires (samples) an unsprung mass displacement $z_1$, and, when the sprung mass resonance condition is satisfied, stores a value less than the unsprung mass displacement $z_1$ as sampled data. Therefore, when the sprung mass resonance condition is satisfied at the time when an unsprung mass displacement $z_1$ is sampled, a value less than an actually measured value of the unsprung mass displacement $z_1$ is stored in the preview reference data 45. Hereinafter, the details of the present modification will be described.

The CPU of the ECU 30 of the present modification, after execution of step 1025 shown in FIG. 10, executes step 1205, step 1215, step 1220, step 1225, step 1230, step 1235, step 1240, step 1245, and step 1250 shown in FIG. 12 in this order.

In step 1205, the CPU acquires a plurality of unsprung mass displacements $z_1$ computed just before the unsprung mass displacement $z_1$ computed in step 1025 shown in FIG. 10, as sampling displacements $z_1$. The number of unsprung mass displacements $z_1$ acquired as sampling displacements $z_1$ is a number required of the CPU to execute a bandpass filtering process (described later). It is assumed that, in step 1025 shown in FIG. 10, the CPU stores a calculated unsprung mass displacement $z_1$ and current time in the RAM in association with each other.

In step 1215, the CPU computes a time-series change in the sampling displacement $z_1$ based on the sampling displacements $z_1$ and the time associated with each sampling displacement $z_1$. In step 1220, the CPU, as in the case of step 930 shown in FIG. 9, acquires sampling displacements $z_1$smp in the first frequency band FB1 (first sampling displacements $z_1$smp) and sampling displacements $z_1$smp in the second frequency band FB2 (second sampling displacements $z_1$smp) from the time-series change. The first frequency band FB1 is set in advance so as to include the sprung mass resonant frequency of the vehicle 10.

In step 1225, the CPU, as in the case of step 935, computes a moving average of the first sampling displacements $z_1$smp as a first component value MG1 and computes a moving average of the second sampling displacements $z_1$smp as a second component value MG2. In step 1230, the CPU, as in the case of step 940, computes the ratio RT (=MG1/MG2).

In step 1235, the CPU, as well as step 945, acquires a weighting factor γ by applying the ratio RT to the weighting factor map MAPγ(RT). In step 1240, the CPU acquires an unsprung mass displacement $z_1$ to be stored as the preview reference data 45 (storage unsprung mass displacement $z_1$) by multiplying the weighting factor γ by the unsprung mass displacement $z_1$ acquired in step 1025 shown in FIG. 10.

In step 1245, the CPU, as in the case of step 1030 shown in FIG. 10, determines a wheel position. In step 1250, the CPU, as in the case of step 1035 shown in FIG. 10, stores the storage unsprung mass displacement $z_1$ and the wheel position in the storage device 30a in association with current time.

After that, the CPU proceeds to step 1295, and once ends the unsprung mass displacement sampling routine. The CPU, as in the case of the above embodiment, sends the unsprung mass displacement $z_1$ and wheel position stored in the storage device 30a to the cloud 40 as sampled data by executing the sampled data sending routine shown in FIG. 11. The preview reference data 45 of the present modification does not need to include a vehicle speed V1. Therefore, the sampled data does not need to include a vehicle speed V1.

The CPU of the present modification executes step 810 shown in FIG. 8 and then proceeds to step 820 without executing step 815 in the preview vibration damping control routine. In step 825, the CPU computes a target controlling force Fct by using a weighting factor γ of which the value is set to one.

Alternatively, the dedicated sampling vehicle may execute the routine shown in FIG. 12. In this case, the CPU of the vibration damping control apparatus 20 does not need to execute the routine shown in FIG. 12.

The management server 42 may correct an unsprung mass displacement $z_1$ included in received sampled data. Hereinafter, this example will be described. A sampling vehicle that is at least one of the vehicle 10 and a dedicated sampling vehicle in this example sends sampled data including a vehicle ID, an unsprung mass displacement $z_1$, position information, and time information. The vehicle ID is an identifier unique to the sampling vehicle.

The management server 42 executes the following process on received sampled data including the same vehicle ID each time a predetermined period of time elapses. Initially, the management server 42 selects intended unsprung mass displacements $z_1$ included in sampled data including the same vehicle ID and acquires sampling displacements $z_1$smp for the intended unsprung mass displacements $z_1$ from the sampled data including the same vehicle ID. Subsequently, the management server 42 computes a time-series change in the sampling displacement $z_1$smp based on the time information of each sampling displacement $z_1$smp. The management server 42 corrects the unsprung mass displacement $z_1$ by executing the same processes as those of step 1220, step 1225, step 1230, step 1235, and step 1240 shown in FIG. 12 based on the time-series change. In other words, when the ratio RT is higher than or equal to the threshold ratio RTth, the management server 42 corrects the intended unsprung mass displacement $z_1$ to a value less than that value. Then, the management server 42 stores the corrected unsprung mass displacement $z_1$ and the position information associated with the unsprung mass displacement $z_1$ in the storage device 44 as the preview reference data 45.

The disclosure is not limited to the above-described embodiment and the above-described modification and may employ various modifications within the scope of the disclosure.

The preview reference data 45 does not need to be stored in the storage device 44 of the cloud 40 and may be stored in the storage device 30a. In this case, the CPU just needs to directly store sampled data in the storage device 30a and does not need to send sampled data to the cloud 40.

When the travel trajectory of the vehicle 10 is determined in advance, the CPU may download in advance the preview reference data 45 of the travel trajectory from the cloud 40 before the vehicle 10 starts traveling along the travel trajectory and store the preview reference data 45 in the storage device 30a.

An unsprung mass velocity $dz_1$ may be stored in the preview reference data 45 in association with position information, instead of an unsprung mass displacement $z_1$. More specifically, the CPU acquires an unsprung mass velocity $dz_1$ at an estimated passage position in step 820 shown in FIG. 8 and computes an unsprung mass displacement $z_1$ by integrating the acquired unsprung mass velocity $dz_1$. The following process is the same as the process of the routine shown in FIG. 8, so the description thereof is omitted. An unsprung mass velocity $dz_1$ acquired when the sprung mass 51 of the vehicle 10 is resonating is higher than an unsprung mass velocity $dz_1$ corresponding to a road surface displacement velocity $dz_0$ that is a time derivative of a road surface displacement $z_0$. The CPU acquires unsprung mass velocities $dz_1$ in a sampling section Ssmp in step 910 shown in FIG. 9 and computes unsprung mass displacements $z_1$ in the sampling section Ssmp by integrating the unsprung mass velocities $dz_1$. The following process is the same as the process of the routine shown in FIG. 9, so the description thereof is omitted.

In step 1025 shown in FIG. 10, the CPU computes an unsprung mass velocity $dz_1$ by evaluating a time derivative of the unsprung mass displacement $z_1$. After that, in step 1035, the CPU stores the unsprung mass velocity $dz_1$, the vehicle speed V1, and the position information in the storage device 30a in association with current time. After that, in the routine shown in FIG. 11, the CPU sends the unsprung mass velocity $dz_1$, the vehicle speed V1, and the position information to the cloud 40 in association with one another. Various methods may be applied as a method of computing an unsprung mass velocity $dz_1$. For example, the CPU may compute a sprung mass velocity $dz_2$ by evaluating a first-order integral of a sprung mass acceleration $ddz_2$, compute a stroke velocity $(dz_2-dz_1)$ by differentiating a stroke H, and compute an unsprung mass velocity $dz_1$ by subtracting the stroke velocity from the sprung mass velocity $dz_2$.

An unsprung mass displacement $z_1$, an unsprung mass velocity $dz_1$, and position information may be stored in the preview reference data 45 in association with one another. In this case, the CPU computes a target controlling force Fct by using the expression (15) and the expression (16).

$$Fcft=\gamma'\times\beta f'\times dz_1+\gamma\times\beta f\times z_1 \quad (15)$$

$$Fcrt=\gamma'\times\beta f'\times dz_1+\gamma\times\beta f\times z_1 \quad (16)$$

In the expression (15) and the expression (16), $\gamma'$ denotes a weighting factor for a derivative term, and $\beta f$ and $\beta r'$ each denote a control gain for a derivative term.

An unsprung mass velocity $dz_1$ acquired when the sprung mass 51 of the vehicle 10 is resonating is higher than an unsprung mass velocity $dz_1$ corresponding to a road surface displacement velocity $dz_0$ that is a time derivative of a road surface displacement $z_0$. For this reason, the CPU acquires a weighting factor $\gamma'$ by applying the ratio RT to a weighting factor map $\gamma r'(RT)$ similar to the weighting factor map MAP$\gamma$(RT) shown in FIG. 7. When the ratio RT is higher than or equal to the threshold ratio RTth (that is, when the sprung mass resonance condition is satisfied), the weighting factor $\gamma'$ is set to such a value that the unsprung mass velocity $dz_1$ reduces from that value.

The unsprung mass displacement $z_1$ and/or the unsprung mass velocity $dz_1$ stored in the preview reference data 45 may be referred to as unsprung mass state quantity.

In the above-described embodiment and modification, the weighting factor $\gamma$ is employed such that, when the sprung mass resonance condition is satisfied, a target controlling force Fct is computed by using a value less than an unsprung mass state quantity at an estimated passage position; however, the configuration is not limited thereto. Alternatively, for example, the control gains $\beta f$, $\beta r$ in the case where the ratio RT is higher than or equal to the threshold ratio RTth may be set so as to be less than the control gains $\beta f$, $\beta r$ in the case where the ratio RT is lower than the threshold ratio RTth.

A process of computing an unsprung mass displacement $z_1$ is not limited to the process described in step 1025 shown in FIG. 10 and may be, for example, a process like examples (a first example and a second example) described below.

The first example will be described. The vibration damping control apparatus 20 of this example includes unsprung mass vertical acceleration sensors for detecting the vertical accelerations of the unsprung masses 50 (unsprung mass accelerations $ddz_1$FR, $ddz_1$FL, $ddz_1$RR, $ddz_1$RL) at the positions of the wheels 11FR, 11FL, 11RR, 11RL. The CPU acquires unsprung mass displacements $z_1$ by evaluating second-order integrals of the unsprung mass accelerations $ddz_1$FR, $ddz_1$FL, $ddz_1$RR, $ddz_1$RL.

The second example will be described. The vibration damping control apparatus 20 of this example estimates unsprung mass displacements $z_1$ by using an observer (not shown) based on any one set of sprung mass accelerations $ddz_2$FR, $ddz_2$FL, $ddz_2$RR, $ddz_2$RL, unsprung mass accelerations $ddz_1$FR, $ddz_1$FL, $ddz_1$RR, $ddz_1$RL, and strokes Hfr, Hfl, Hrr, Hrl respectively detected by the stroke sensors 32FR, 32FL, 32RR, 32RL.

The vertical acceleration sensors 31 may be provided in correspondence with at least three wheels. A sprung mass acceleration corresponding to the wheel having no vertical acceleration sensor 31 is able to be estimated based on sprung mass accelerations detected by the three vertical acceleration sensors 31.

A process of computing a target controlling force Fcrt for the rear wheel 11R is not limited to the above-described example. For example, the CPU may compute a target controlling force Fcrt in advance based on an unsprung mass displacement $z_1$ at a current position of the front wheel 11F at current time tp and send a control command including the target controlling force Fcrt to the rear wheel active actuator 17R at timing delayed by a time (L/V−tpr) from the current time tp. In other words, the CPU may send a control command including a target controlling force Fcrt to the rear wheel active actuator 17R at timing at which the rear wheel 11R has reached a point a rear wheel look-ahead distance Lpr before the current position of the front wheel 11F. An unsprung mass displacement $z_1$ at a current position of the front wheel 11F may be acquired from the preview reference data 45 or may be acquired based on a sprung mass acceleration $ddz_2$ or unsprung mass acceleration $ddz_1$ corresponding to the position of the front wheel 11F.

Another method will be described below. The CPU determines an estimated rear wheel movement trajectory based on the current position of the rear wheel 11R, the travel direction Td of the vehicle 10, and the position relation data, independently of an estimated front wheel movement trajectory and determines a position a rear wheel look-ahead distance Lpr away along the estimated rear wheel movement trajectory as an estimated passage position. Then, the CPU acquires an unsprung mass displacement $z_1$ at the estimated rear wheel passage position from the preview reference data 45 and computes a target controlling force Fcrt for the rear wheel 11R based on the acquired unsprung mass displacement $z_1$.

The vehicle speed V1 and the travel direction Td are acquired based on the current position of the vehicle 10, acquired by the GNSS receiver; however, the configuration is not limited thereto. For example, the vibration damping control apparatus 20 includes wheel speed sensors and a steering angle sensor (not shown). Each wheel speed sensor may detect the rotation speed of a corresponding one of the wheels 11, and the CPU may compute a vehicle speed V1 based on the rotation speed of each wheel 11. A yaw rate sensor detects a yaw rate that acts on the vehicle 10. The CPU may acquire a travel direction Td based on the yaw rate and the vehicle speed V1.

The suspensions 13FR, 13FL, 13RR, 13RL may be of any type as long as each of the suspensions 13FR, 13FL, 13RR, 13RL allows the vehicle body 10a and a corresponding one of the wheels 11FR, 11FL, 11RR, 11RL to be displaced in the vertical direction relative to each other. Each of the suspension springs 16FR, 16FL, 16RR, 16RL may be any spring, such as a compression coil spring and an air spring.

In the above-described embodiment, the active actuators 17FR, 17FL, 17RR, 17RL are provided in correspondence with the wheels 11; however, one active actuator 17 just needs to be provided for at least one wheel 11. For example, the vehicle 10 may include only one set of the front wheel active actuators 17F and the rear wheel active actuators 17R.

In the above-described embodiment and modification, the active actuators 17 are used as controlling force generators; however, the controlling force generators are not limited thereto. In other words, the controlling force generator just needs to be an actuator capable of adjustably generating a controlling force in the vertical direction for damping the vibration of the sprung mass 51 based on a control command including a target controlling force.

The controlling force generator may be an active stabilizer apparatus (not shown). The active stabilizer apparatus includes a front wheel active stabilizer and a rear wheel active stabilizer. When a controlling force in the vertical direction (left front wheel controlling force) is generated between the sprung mass 51 and the unsprung mass 50 corresponding to the left front wheel 11FL, the front wheel active stabilizer generates a controlling force in the opposite direction to the left front wheel controlling force (that is, a right front wheel controlling force) between the sprung mass 51 and the unsprung mass 50 corresponding to the right front wheel 11FR. Similarly, when a controlling force in the vertical direction (left rear wheel controlling force) is generated between the sprung mass 51 and the unsprung mass 50 corresponding to the left rear wheel 11RL, the rear wheel active stabilizer generates a controlling force in the opposite direction to the left rear wheel controlling force (that is, a right rear wheel controlling force) between the sprung mass 51 and the unsprung mass 50 corresponding to the right rear wheel 11RR. The configuration of the active stabilizer apparatus is known and is incorporated herein by reference to Japanese Unexamined Patent Application Publication No. 2009-096366 (JP 2009-096366 A). The active stabilizer apparatus just needs to include at least one of the front wheel active stabilizer and the rear wheel active stabilizer.

The controlling force generator may generate a controlling force Fc in the vertical direction by using the geometry of the suspensions 13FR, 13FL, 13RR, 13RL by increasing or reducing a braking or driving force on each wheel 11 of the vehicle 10. The configuration of such an apparatus is known and may be incorporated herein by reference to Japanese Unexamined Patent Application Publication No. 2016-107778 (JP 2016-107778 A), or the like. The ECU 30 computes a braking or driving force for generating a controlling force Fc corresponding to a target controlling force Fct with a known technique. Such an apparatus includes a drive device (for example, an in-wheel motor) that applies a driving force to each wheel 11 and a braking device (brake device) that applies a braking force to each wheel 11. The drive device may be a motor, an engine, or the like that applies a driving force to any one pair of front wheels and rear wheels or four wheels. The controlling force generator just needs to include at least one of the drive device and the braking device.

The controlling force generator may be adjustable shock absorbers 15FR, 15FL, 15RR, 15RL. In this case, the ECU 30 controls the damping coefficients C of the shock absorbers 15FR, 15FL, 15RR, 15RL such that the damping force of each of the shock absorbers 15FR, 15FL, 15RR, 15RL varies by a value corresponding to a target controlling force Fct.

What is claimed is:

1. A vibration damping control apparatus for a vehicle, the vibration damping control apparatus comprising:
    an active actuator configured to generate a controlling force in a vertical direction between a vehicle body portion and at least one wheel for damping a vibration of a sprung mass of the vehicle; and
    a control unit configured to change the controlling force by controlling the active actuator based on an unsprung mass state quantity at an estimated passage position through which the at least one wheel is estimated to pass at a point in time after a lapse of a predetermined period of time from current time, wherein:
    the unsprung mass state quantity is a value acquired when a sampling vehicle, that is a different vehicle, travels on a road surface and is a value indicating a state of displacement of an unsprung mass of the sampling vehicle that is displaced in an up-down direction due to a displacement of the road surface in the vertical direction; and
    the control unit is configured to:
        when a sprung mass resonance condition that is satisfied in a case where the sprung mass of the sampling vehicle is resonating when the sampling vehicle passes through the estimated passage position is satisfied, compute a target controlling force based on the unsprung mass state quantity acquired by the sampling vehicle at the estimated passage position, the target controlling force being a target value of the controlling force generated by the active actuator at a point in time at which the at least one wheel of the vehicle passes through the estimated passage position,
        when the sprung mass resonance condition is satisfied, compute the target controlling force based on a value less than the unsprung mass state quantity acquired by the sampling vehicle at the estimated passage position,
        at the point in time at which the at least one wheel of the vehicle passes through the estimated passage position, control the active actuator such that a controlling force generated by the active actuator is equal to the target controlling force,
        acquire a plurality of unsprung mass state quantities in a predetermined sampling section including the estimated passage position as sampled state quantities from preview reference data, the preview reference data including a set of data in which an unsprung mass state quantity acquired when the sampling vehicle travels the road surface and position information indicating a position of the at least one wheel at which the unsprung mass state quantity is acquired are associated with each other,
        when a relation between an evaluation value, which is calculated based on the sampled state quantities and used to determine whether the sprung mass resonance condition is satisfied, and a preset threshold does not satisfy the predetermined condition, determine that the sprung mass resonance condition is not satisfied, and compute the target controlling force based on the sprung mass state quantity at the estimated passage position, acquired from the preview reference data, when the relation between the evaluation value and the threshold satisfies the predetermined condition, determine that the sprung mass resonance condition is satisfied, and compute the target controlling force based on a value less than the unsprung mass state quantity at the estimated passage position, acquired from the preview reference data, compute a time-series change in the sampled state quantity based on a vehicle speed when the sampling vehicle travels in the sampling section, based on the time-series change, compute a first component value indicating a magnitude of the sampled state quantities in a first frequency band including a preset sprung resonant frequency, and a second component value indicating a magnitude of the sampled state quantities in a second frequency band including a minimum frequency higher than a maximum frequency of the first frequency band, compute a ratio of the first component value to the second component value as the evaluation value, and when the ratio is higher than or equal to a preset threshold ratio, determine that the sprung mass resonance condition is satisfied.

2. The vibration damping control apparatus according to claim 1, wherein:

the unsprung mass state quantity acquired by the sampling vehicle is directly stored in the preview reference data in a case where the sprung mass resonance condition is not satisfied at a point in time at which the sampling vehicle acquires the unsprung mass state quantity; and a value less than the unsprung mass state quantity acquired by the sampling vehicle is stored in the preview reference data in a case where the sprung mass resonance condition is satisfied at the point in time at which the sampling vehicle acquires the unsprung mass state quantity.

3. The vibration damping control apparatus according to claim 2, wherein, when the relation between the evaluation value and the preset threshold satisfies the predetermined condition, values respectively less than the unsprung mass state quantities acquired by the sampling vehicle are stored in the preview reference data.

4. The vibration damping control apparatus according to claim 3, wherein:

when the ratio of the first component value to the second component value is higher than or equal to the preset threshold ratio, values respectively less than the unsprung mass state quantities acquired by the sampling vehicle are stored in the preview reference data.

5. A vibration damping control method that changes a controlling force in a vertical direction for damping a vibration of a sprung mass of a vehicle by controlling an active actuator, which is configured to generate the controlling force between a vehicle body portion and at least one wheel, based on an unsprung mass state quantity at an estimated passage position through which the at least one wheel is estimated to pass at a point in time after a lapse of a predetermined period of time from current time, the unsprung mass state quantity being a value acquired when a sampling vehicle, that is a different vehicle, travels on a road surface and being a value indicating a state of displacement of an unsprung mass of the sampling vehicle that is displaced in an up-down direction due to a displacement of the road surface in the vertical direction, the vibration damping control method comprising:

when a sprung mass resonance condition that is satisfied in a case where the sprung mass of the sampling vehicle is resonating when the sampling vehicle passes through the estimated passage position is satisfied, computing a target controlling force based on the unsprung mass state quantity acquired by the sampling vehicle at the estimated passage position, the target controlling force being a target value of the controlling force generated by the active actuator at a point in time at which the at least one wheel of the vehicle passes through the estimated passage position;

when the sprung mass resonance condition is satisfied, computing the target controlling force based on a value less than the unsprung mass state quantity acquired by the sampling vehicle at the estimated passage position;

at the point in time at which the at least one wheel of the vehicle passes through the estimated passage position, controlling the active actuator such that a controlling force generated by the active actuator is equal to the target controlling force;

acquiring a plurality of unsprung mass state quantities in a predetermined sampling section including the estimated passage position as sampled state quantities from preview reference data, the preview reference data including a set of data in which an unsprung mass state quantity acquired when the sampling vehicle travels the road surface and position information indicating a position of the at least one wheel at which the unsprung mass state quantity is acquired are associated with each other, when a relation between an evaluation value, which is calculated based on the sampled state quantities and used to determine whether the sprung mass resonance condition is satisfied, and a preset threshold does not satisfy the predetermined condition, determining that the sprung mass resonance condition is not satisfied, and compute the target controlling force based on the sprung mass state quantity at the estimated passage position, acquired from the preview reference data, when the relation between the evaluation value and the threshold satisfies the predetermined condition, determining that the sprung mass resonance condition is satisfied, and computing the target controlling force based on a value less than the unsprung mass state quantity at the estimated passage position, acquired from the preview reference data, computing a time-series change in the sampled state quantity based on a vehicle speed when the sampling vehicle travels in the sampling section, based on the time-series change, computing a first component value indicating a magnitude of the sampled state quantities in a first frequency band including a preset sprung resonant frequency, and a second component value indicating a magnitude of the sampled state quantities in a second frequency band including a minimum frequency higher than a maximum frequency of the first frequency band, computing a ratio of the first component value to the second component value as the evaluation value, and when the ratio is higher than or equal to a preset threshold ratio, determining that the sprung mass resonance condition is satisfied.

* * * * *